US012049014B2

(12) United States Patent
Vu et al.

(10) Patent No.: US 12,049,014 B2
(45) Date of Patent: *Jul. 30, 2024

(54) WORKPLACE MONITORING AND SEMANTIC ENTITY IDENTIFICATION FOR SAFE MACHINE OPERATION

(71) Applicants: Clara Vu, Cambridge, MA (US); Scott Denenberg, Newton, MA (US); Marek Wartenberg, Westbrook, ME (US); Paul Jakob Schroeder, Chapel Hill, NC (US); Ilya A. Kriveshko, Boxborough, MA (US); Alberto Moel, Cambridge, MA (US)

(72) Inventors: Clara Vu, Cambridge, MA (US); Scott Denenberg, Newton, MA (US); Marek Wartenberg, Westbrook, ME (US); Paul Jakob Schroeder, Chapel Hill, NC (US); Ilya A. Kriveshko, Boxborough, MA (US); Alberto Moel, Cambridge, MA (US)

(73) Assignee: VEO ROBOTICS, INC., Waltham, MA (US)

( * ) Notice: Subject to any disclaimer, the term of this patent is extended or adjusted under 35 U.S.C. 154(b) by 402 days.

This patent is subject to a terminal disclaimer.

(21) Appl. No.: 17/538,501

(22) Filed: Nov. 30, 2021

(65) Prior Publication Data
US 2022/0088787 A1    Mar. 24, 2022

Related U.S. Application Data

(63) Continuation-in-part of application No. 17/101,792, filed on Nov. 23, 2020, now Pat. No. 11,376,741, (Continued)

(51) Int. Cl.
*B25J 9/16*    (2006.01)
*G01S 7/48*    (2006.01)
(Continued)

(52) U.S. Cl.
CPC ........... *B25J 9/1694* (2013.01); *B25J 9/1666* (2013.01); *B25J 9/1676* (2013.01); *B25J 9/1697* (2013.01);
(Continued)

(58) Field of Classification Search
CPC ...... B25J 9/1666; B25J 9/1697; B25J 9/1676; G01S 17/04; G01S 17/87; G01S 7/4808;
(Continued)

(56) References Cited

U.S. PATENT DOCUMENTS 6,212,444 B1    4/2001    Kato et al.
6,297,844 B1    10/2001    Schatz et al.
(Continued)

FOREIGN PATENT DOCUMENTS

EP    3248740 A1    11/2017
WO    2016122840 A1    8/2016
(Continued)

OTHER PUBLICATIONS

International Search Report for International Application No. PCT/US2018/016991 dated May 16, 2018, 12 pages.
(Continued)

*Primary Examiner* — Masud Ahmed
(74) *Attorney, Agent, or Firm* — Morgan, Lewis & Bockius LLP

(57) ABSTRACT

An integrated system and method for monitoring a workspace, classifying regions therein, dynamically identifying safe states, and identifying and tracking workpieces utilizes semantic analysis of a robot in the workspace and identification of the workpieces with which it interacts, as well as a semantic understanding of entity properties both governing and arising from interaction with other entities for control purposes. These properties may be stored in a profile corresponding to the entity; depending on the implementation,
(Continued)

the profile and methods associated with the entity may be stored in a data structure corresponding to the entity "class." Volumetric regions (e.g., voxels) corresponding to each entity may be tracked and used to implement object methods and/or control methods. For example, machinery may be controlled in accordance with the attributes specified by the objects corresponding to identified entities in a monitored workspace.

52 Claims, 9 Drawing Sheets

Related U.S. Application Data which is a continuation of application No. 15/889,767, filed on Feb. 6, 2018, now Pat. No. 10,882,185.

(60) Provisional application No. 63/152,113, filed on Feb. 22, 2021.

(51) Int. Cl.
| | |
|---|---|
| *G01S 17/04* | (2020.01) |
| *G01S 17/87* | (2020.01) |
| *G01S 17/89* | (2020.01) |
| *G06T 17/10* | (2006.01) |
| *G01V 8/20* | (2006.01) |
| *G06T 17/05* | (2011.01) |

(52) U.S. Cl.
CPC ............ *G01S 7/4808* (2013.01); *G01S 17/04* (2020.01); *G01S 17/87* (2013.01); *G01S 17/89* (2013.01); *G06T 17/10* (2013.01); *G01V 8/20* (2013.01); *G05B 2219/40202* (2013.01); *G06T 17/05* (2013.01); *Y10S 901/47* (2013.01); *Y10S 901/49* (2013.01)

(58) Field of Classification Search
CPC ......... G01S 17/89; G06T 17/10; G06T 17/05; G05B 2219/40202; G01V 8/20; Y10S 901/49; Y10S 901/47
See application file for complete search history.

(56) References Cited

U.S. PATENT DOCUMENTS

| | | | |
|---|---|---|---|
| 6,816,755 B2 | 11/2004 | Habibi et al. | |
| 7,336,814 B2 | 2/2008 | Boca et al. | |
| 8,154,590 B2 | 4/2012 | Kressel et al. | |
| 8,253,792 B2 | 8/2012 | Wells et al. | |
| 8,437,535 B2 | 5/2013 | Boca et al. | |
| 8,559,699 B2 | 10/2013 | Boca | |
| 8,700,197 B2 | 4/2014 | Plociennik et al. | |
| 9,043,025 B2 | 5/2015 | Brooks et al. | |
| 9,122,266 B2* | 9/2015 | Franke ............... | G05B 19/4061 |
| 9,240,070 B2 | 1/2016 | Anderson-Sprecher et al. | |
| 9,283,678 B2 | 3/2016 | Kuffner, Jr. et al. | |
| 9,452,531 B2 | 9/2016 | Kikkeri et al. | |
| 9,691,151 B1 | 6/2017 | Anderson-Sprecher et al. | |
| 9,734,401 B2 | 8/2017 | Hunt | |
| 9,740,193 B2 | 8/2017 | Hunt | |
| 9,827,681 B2 | 11/2017 | Naitou et al. | |
| 10,445,944 B2 | 10/2019 | Galera et al. | |
| 2005/0055134 A1* | 3/2005 | Okuda ................ | B25J 9/1666 |
| | | | 700/245 |
| 2005/0207618 A1 | 9/2005 | Wohler et al. | |
| 2008/0021597 A1 | 1/2008 | Merte et al. | |
| 2008/0152192 A1 | 6/2008 | Zhu et al. | |
| 2009/0015663 A1 | 1/2009 | Doettling et al. | |
| 2010/0092032 A1* | 4/2010 | Boca .................. | B25J 9/1679 |
| | | | 382/103 |
| 2011/0264266 A1 | 10/2011 | Kock | |
| 2012/0022688 A1 | 1/2012 | Wong et al. | |
| 2012/0022689 A1* | 1/2012 | Kapoor ................. | B25J 9/1666 |
| | | | 700/255 |
| 2013/0201292 A1 | 8/2013 | Walter et al. | |
| 2014/0093130 A1 | 4/2014 | Dasu et al. | |
| 2015/0049911 A1 | 2/2015 | Doettling et al. | |
| 2015/0131896 A1* | 5/2015 | Hu ......................... | B25J 9/1676 |
| | | | 382/153 |
| 2015/0269427 A1 | 9/2015 | Kim et al. | |
| 2015/0293600 A1* | 10/2015 | Sears .................. | H04N 13/271 |
| | | | 345/156 |
| 2016/0016315 A1* | 1/2016 | Kuffner, Jr ............ | B25J 9/1676 |
| | | | 700/255 |
| 2016/0167231 A1* | 6/2016 | Nakayama ............ | B25J 9/1676 |
| | | | 700/255 |
| 2016/0282126 A1 | 9/2016 | Watts et al. | |
| 2016/0354927 A1* | 12/2016 | Kikkeri .................. | B25J 9/1676 |
| 2017/0057095 A1 | 3/2017 | Oestergaard et al. | |
| 2017/0151676 A1 | 6/2017 | Atherton et al. | |
| 2017/0197311 A1* | 7/2017 | Garcia .................. | G01S 15/931 |
| 2017/0210017 A1* | 7/2017 | Yamamoto ............. | B25J 9/1697 |
| 2017/0302905 A1 | 10/2017 | Shteinfeld et al. | |
| 2017/0334063 A1 | 11/2017 | Komatsuzaki et al. | |
| 2017/0334066 A1 | 11/2017 | Levine et al. | |
| 2017/0334076 A1 | 11/2017 | Bordegnoni et al. | |
| 2017/0341231 A1 | 11/2017 | Tan et al. | |
| 2017/0355079 A1 | 12/2017 | Takahashi | |

FOREIGN PATENT DOCUMENTS

| | | |
|---|---|---|
| WO | 2017199261 A1 | 11/2017 |
| WO | 2017203937 A1 | 11/2017 |
| WO | 2017207436 A1 | 12/2017 |

OTHER PUBLICATIONS

Anandan, Tanya M. "The Shrinking Footprint of Robot Safety," Robotics Online, Oct. 6, 2014, 9 pages.
Anandan, Tanya M. "The End of Separation: Man and Robot as Collaborative Coworkers on the Factory Floor," Robotics Online, Jun. 6, 2013, 8 pages.
Cui, et al. "Robotics Safety: An Engineering Teaching Module," University of Ontario, Institute of Technology, Minerva Canada, Mar. 2014, 39 pages.
Fetzner, et al. "Obstacle Detection and Tracking for Safe Human-Robot Interaction Based on Multi-Sensory Point Clouds.".
Flacco, et al. "A Depth Space Approach to Human-Robot Collision Avoidance," 2012 IEEE International Conference on Robotics and Automation, May 14-18, 2012, 8 pages.
Frank, Rudiger, Dr. "Modular Sensor System for Safe Robots," https://www.automation.com/automation-news/article/ modular-sensor-system-for-safe-robots, Nov. 25, 2017, 14 pages.
Frese, et al. "Multi-Sensor Obstacle Tracking for Safe Human-Robot Interation," Fraunhofer Institute of Optics, System Technologies and Image Explitation IOSB, 2014, 8 pages.
Graham, et al. "A Sensory-Based Robotic Safety System," IEE Proceedings, vol. 132, Pt D, No. 4, Jul. 1985, 7 pages.
Graham, et al. "A Safety and Collision Avoidance System for Industrial Robots," IEEE Transactions on Industry Applications, vol. IA-22, No. 1, January/Feb. 1986, 9 pages.
Kock, et al. "Taming the robot," Robotic Highlights, ABB Review, Apr. 2006, 4 pages.
Lacevic, et al. "Kinetostatic danger field - A novel safety assessment for human-robot interation," ResearchGate, Jun. 9, 2016, 8 pages.
Lasota, et al. "A Survey of Methods for Safe Human-Robot Interation," Foundations and Trends in Robotics, vol. 5, No. 4 (2014), 92 pages.
Lasota, et al. "Towards Safe Close-Proximity Human-Robot Interaction with Standard Industrial Robots," IEEE, 2014, 7 pages.
Lenz, et al. "Fusing multiple Kinects to survey shared Human-Robot-Workspaces," Robotics and Embedded Systems Department of Informatics Technische Universir-at Munchen, 6 pages.
Murray, et al. "Robot Motion Planning on a Chip," Departments of Computer Science and Electrical & Computer Engineering, Duke University, 9 pages.

(56) References Cited

OTHER PUBLICATIONS

Pilz, GB. "Safe human-robot collaboration: from theory to practice," https://www.pilz.com/en-GB/company/news/ article/084837, Aug. 6, 2015, 4 pages.
Rybski, et al. "Sensor Fusion for Human Safety in Industrial Workcells," Carnegie Mellon University Research Showcase @ CMU, Oct. 2012, 9 pages.
ABB Robotics Produce Management, "SafeMove2," Jul. 24, 2017, 25 pages.
ABB Robotics Produce Management, "SafeMove2 Protecting operators and enhancing robot safety," abb.com/ robotics, 2 pages.
Vogel, et al. "A Projection-based Sensor System for Safe Physical Human-Robot Collaboration," 2013 IEEE/RSJ International Conference on Intelligent Robotcs and Systems (ROS), Nov. 3-7, 2013, 6 pages.
Zanchettin, et al. "Safety in Human-Robot Collaborative Manufacturing Environments: Metrics and Control," IEEE Transactions on Automation Science and Engineering, vol. 13, No. 2, Apr. 2016, 12 pages.
Christiernin, et al. "Safety Critical Robot Programming and Testing for Operations in Industrial Co-production," IEEE International Symposium on Software Reliability Engineering Workshops, 2014, 4 pages.

\* cited by examiner

WORKPLACE MONITORING AND SEMANTIC ENTITY IDENTIFICATION FOR SAFE MACHINE OPERATION

CROSS-REFERENCE TO RELATED APPLICATION

This is a continuation-in-part of, and incorporates herein by reference in its entirety, U.S. Ser. No. 17/101,792, filed on Nov. 23, 2020, which is a continuation of U.S. Ser. No. 15/889,767, filed on Feb. 6, 2018, now U.S. Pat. No. 10,882,185. This application also claims priority to and the benefits of U.S. Ser. No. 63/152,113, filed on Feb. 22, 2021, which is also hereby incorporated by reference in its entirety.

FIELD OF THE INVENTION

The field of the invention relates, generally, to monitoring of industrial environments where humans and machinery interact or come into proximity, and in particular to systems and methods for detecting unsafe conditions in a monitored workspace.

BACKGROUND

Industrial robotic arms have been used in manufacturing processes for decades, and range in size from smaller than a human arm—with payloads as small as a few pounds—up to many times the size of an entire human with payloads of hundreds or thousands of pounds, which can also be many feet in length and width. Typically, robot arms consist of a number of mechanical links connected by rotating joints that can be precisely controlled, and a controller that coordinates all of the joints to achieve trajectories that are determined by an industrial engineer for a specific application.

Because these robots are large, strong, and fast, they are capable of doing severe harm to a human over a wide "envelope" of possible movement trajectories. When industrial robots first came into widespread use, no sufficiently reliable sensing technologies were available to sense humans and other obstacles. For this reason, industrial robots traditionally have been enclosed by cages, typically made of metal, that prevent humans from approaching anywhere within the robot's reach. As precise sensing and control technologies became available, they began to replace cages in some applications, but for safety are typically configured to respond—e.g., by shutting down or limiting operation of the robot—when any intrusion is detected in an exclusion zone defined by the robot's movement envelope.

Because both floor space and robot operating time are precious commodities in factory settings, limiting the exclusion zone dictated by the movement envelope would be desirable so long as safety is not compromised. One factor contributing to larger-than-needed exclusion zones is the need to consider movement not only of the robot but also any workpieces grasped by or otherwise associated with movable portions of the robot. Even if a robot picks up the largest workpiece very infrequently, safety typically demands defining the exclusion zone based on the worst-case scenario. Moreover, if the robot begins handling new workpieces, it may be necessary to recompute the entire exclusion zone—a cumbersome and often-demanding task.

Limitations on robot operation (and therefore productivity) arise not only from the exclusion zone around the robot but the diversity of entities and people who may be in the workspace. A robot is expected to make contact with workpieces but may also be permitted to approach inanimate entities much more closely than humans, from whom a calculated separation distance is prescribed by applicable safety standards. Moreover, inanimate entities are not necessarily static—they can move, be moved, grow or diminish in volume; for example, cartons may be stacked on and removed from a pallet over the course of time. Maintaining awareness of entity types as these migrate, change shape and occlude each other is a significant machine-vision challenge.

SUMMARY

Systems and methods in accordance with the invention represent entities in a workspace (including humans) in a manner that reflects semantic understanding of the entities, their properties, capabilities, intentions and vulnerabilities. Safety can then be implemented in terms of a set of semantic rules, e.g.: a robot may touch a workpiece or other inanimate entity; a robot must maintain a separation distance from a person; when a carton is placed on a pallet, it remains a carton but the set of cartons on the pallet has increased in size, and all have carton properties (e.g., they may be picked up by a human or a robot); if a person picks up a carton, the robot must maintain the separation distance from the person-carton combination. (The latter rule is for safety so that the robot does not make potentially injurious fine distinctions between the person and the carton being held. Safety considerations would not require the robot to avoid a large table that a person is touching so long as adequate distance from the person is maintained.) Given this framework, a wide variety of complex processes may be implemented without extensive custom logic or additional design effort and machinery.

As described in U.S. Patent Publ. No. 2021/0069907, incorporated by reference above, semantic understanding may be employed to distinguish between workpieces that might become associated with the machinery and other entities (including humans) in the workspace from those that will not, and detect when, for example, a robot is carrying a workpiece. In typical operation, the workpiece is treated as part of the robot for purposes of establishing an envelope of possible robot trajectories. The envelope is tracked as the robot and workpiece move together in the workcell and occupied space corresponding thereto are dynamically marked as not empty and not safe. 3D spaces occluded by the robot-workpiece combination are marked as not empty unless independent verification of emptiness can be obtained from additional sensors.

Embodiments of the present invention provide an integrated system for monitoring a workspace, classifying regions therein, identifying an operator presence, action, or gesture within the classified regions, dynamically identifying safe states, and identifying and tracking workpieces. The latter function may involve semantic analysis of a robot in the workspace and identification of the workpieces with which it interacts, as well as a semantic understanding of entity properties both governing and arising from interaction with other entities for control purposes. These properties may be stored in a profile corresponding to the entity; depending on the implementation, the profile and methods associated with the entity may be stored in a data structure corresponding to the entity "class." Volumetric regions (e.g., voxels) corresponding to each entity may be tracked and used to implement object methods and/or control methods.

For example, a method of a carton object may create a new "stack" object when the carton is placed atop another carton, or if the stack object already exists, the method may add the carton to that object. A control method may monitor the closest distance between the stack of cartons and a robot using the volumetric representation of each object and a 3D representation of the workspace. So long as no human is in contact with the stack object or any component carton object thereof, the robot is permitted to make contact with it; but if a human is determined to make contact with the stack object or any component carton, the separation distance is enforced and the robot must maintain the prescribed distance from the stack object until the human steps away from the stack (possibly carrying a carton from the stack object), at which point the stack may make contact with the robot.

As used herein, the term "entity" refers generally to humans and inanimate items in a monitored workspace. The term "object" refers to a computational construct or representation associated with an entity, and which may specify entity attributes and/or entity-specific or class-specific methods. It should be stressed that a computational "object" need not be explicitly represented in an object-oriented format.

In general, as used herein, the term "substantially" means ±10%, and in some embodiments, ±5%. In addition, reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

In the following discussion, we describe an integrated system for monitoring a workspace, classifying regions therein for safety purposes, and dynamically identifying safe states. In some cases the latter function involves semantic analysis of a robot in the workspace and identification of the workpieces with which it interacts. It should be understood, however, that these various elements may be implemented separately or together in desired combinations; the inventive aspects discussed herein do not require all of the described elements, which are set forth together merely for ease of presentation and to illustrate their interoperability. The system as described represents merely one embodiment.

1. Workspace Monitoring

Figure 1:
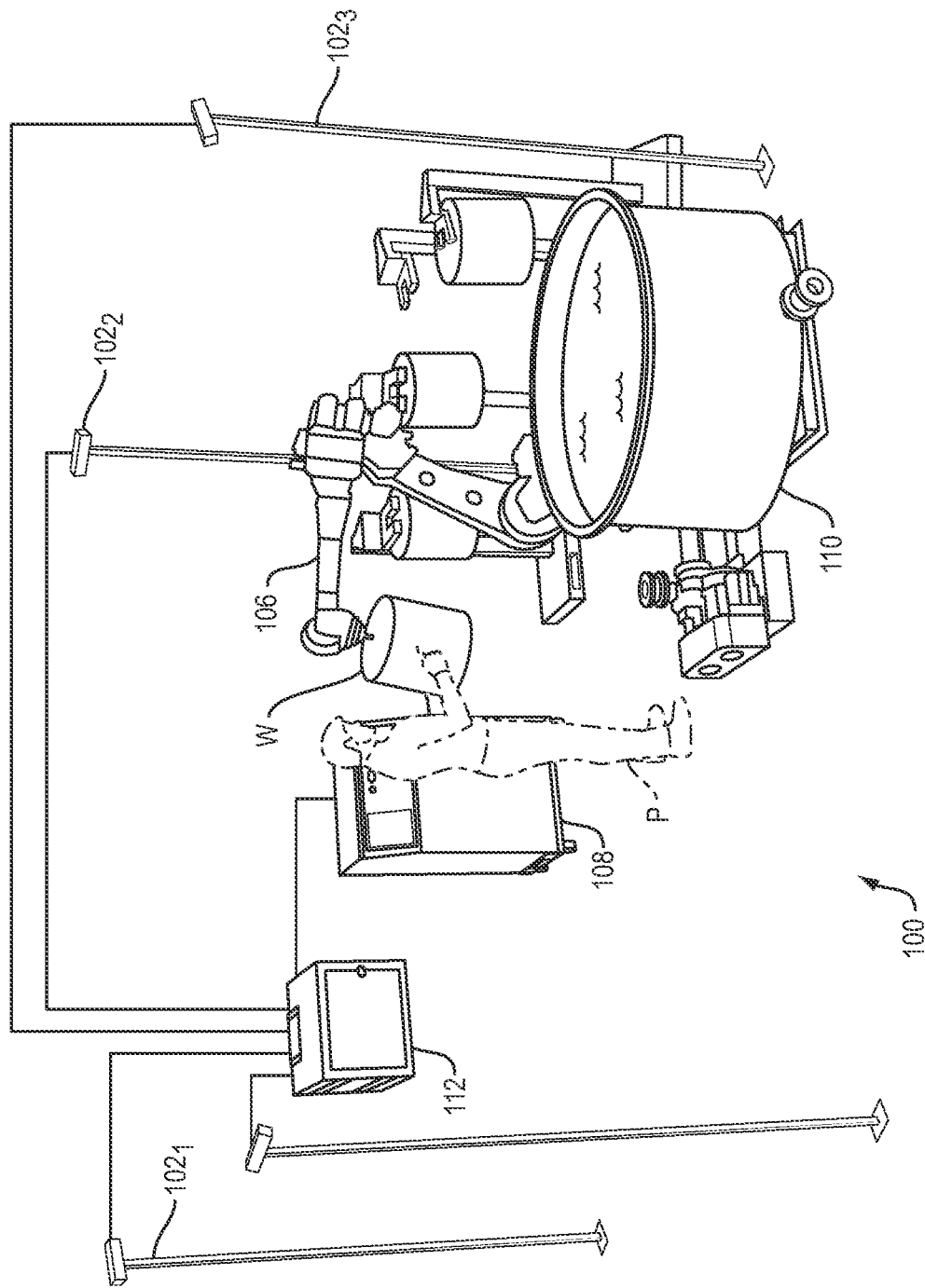
FIG. 1 is a perspective view of a monitored workspace in accordance with an embodiment of the invention.

Refer first to FIG. 1, which illustrates a representative 3D workspace 100 monitored by a plurality of sensors representatively indicated at $102_1$, $102_2$, $102_3$. The sensors 102 may be conventional optical sensors such as cameras, e.g., 3D time-of-flight cameras, stereo vision cameras, or 3D LIDAR sensors or radar-based sensors, ideally with high frame rates (e.g., between 30 Hz and 100 Hz). The mode of operation of the sensors 102 is not critical so long as a 3D representation of the workspace 100 is obtainable from images or other data obtained by the sensors 102. As shown in the figure, sensors 102 collectively cover and can monitor the workspace 100, which includes a robot 106 controlled by a conventional robot controller 108. The robot interacts with various workpieces W, and a person P in the workspace 100 may interact with the workpieces and the robot 108. The workspace 100 may also contain various items of auxiliary equipment 110, which can complicate analysis of the workspace by occluding various portions thereof from the sensors. Indeed, any realistic arrangement of sensors will frequently be unable to "see" at least some portion of an active workspace. This is illustrated in the simplified arrangement of FIG. 1: due to the presence of the person P, at least some portion of robot controller 108 may be occluded from all sensors. In an environment that people traverse and where even stationary objects may be moved from time to time, the unobservable regions will shift and vary.

Figure 2:
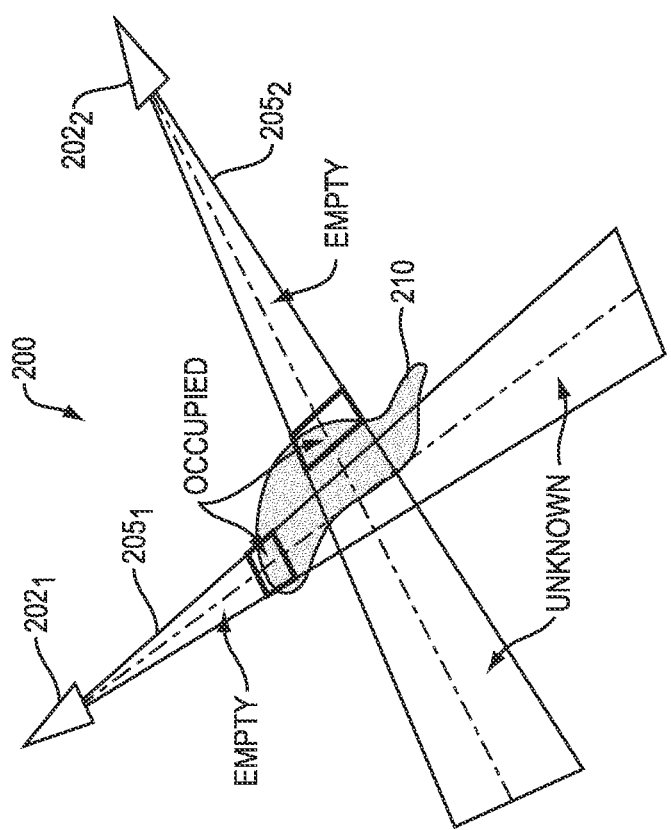
FIG. 2 schematically illustrates classification of regions within the monitored workspace in accordance with an embodiment of the invention.

As shown in FIG. 2, embodiments of the present invention classify workspace regions as occupied, unoccupied (or empty), or unknown. For ease of illustration, FIG. 2 shows two sensors $202_1$, $202_2$ and their zones of coverage $205_1$, $205_2$ within the workspace 200 in two dimensions; similarly, only the 2D footprint 210 of a 3D object is shown. The portions of the coverage zones 205 between the object boundary and the sensors 200 are marked as unoccupied, because each sensor affirmatively detects no obstructions in this intervening space. The space at the object boundary is marked as occupied. In a coverage zone 205 beyond an object boundary, all space is marked as unknown; the corresponding sensor is configured to sense occupancy in this region but, because of the intervening object 210, cannot do so.

With renewed reference to FIG. 1, data from each sensor 102 is received by a control system 112. The volume of space covered by each sensor—typically a solid cone—may be represented in any suitable fashion, e.g., the space may be divided into a 3D grid of small (5 cm, for example) cubes or "voxels" or other suitable form of volumetric representation. For example, workspace 100 may be represented using 2D or 3D ray tracing, where the intersections of the 2D or 3D rays emanating from the sensors 102 are used as the volume coordinates of the workspace 100. This ray tracing can be performed dynamically or via the use of precomputed volumes, where objects in the workspace 100 are previously identified and captured by control system 112. For convenience of presentation, the ensuing discussion assumes a voxel representation; control system 112 maintains an internal representation of the workspace 100 at the voxel level, with voxels marked as occupied, unoccupied, or unknown.

Figure 3:
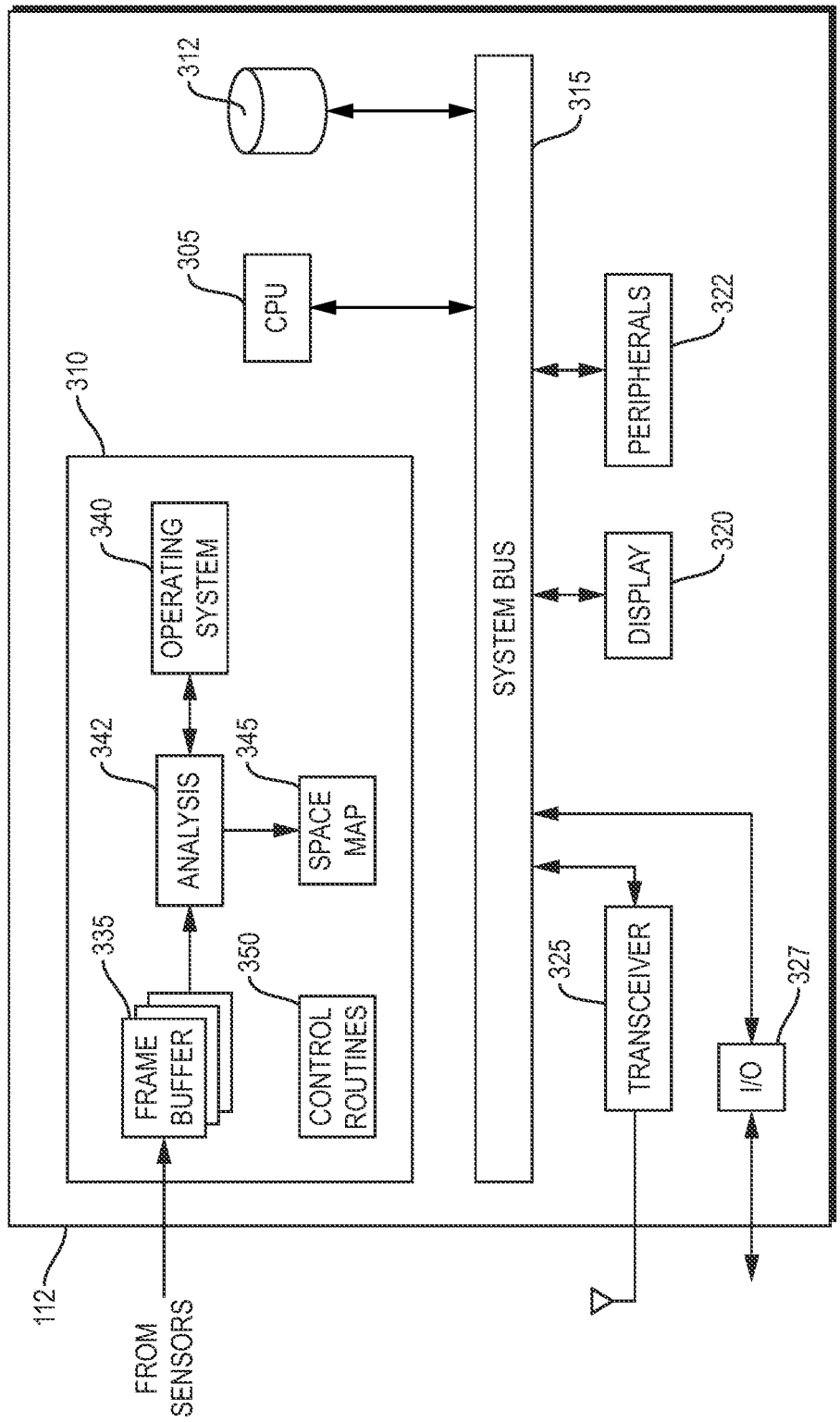
FIG. 3 schematically illustrates a control system in accordance with an embodiment of the invention.

FIG. 3 illustrates, in greater detail, a representative embodiment of control system 112, which may be implemented on a general-purpose computer. The control system 112 includes a central processing unit (CPU) 305, system memory 310, and one or more non-volatile mass storage devices (such as one or more hard disks and/or optical storage units) 312. The system 112 further includes a bidirectional system bus 315 over which the CPU 305, memory 310, and storage device 312 communicate with each other as well as with internal or external input/output (I/O) devices such as a display 320 and peripherals 322, which may include traditional input devices such as a keyboard or a mouse). The control system 112 also includes a wireless transceiver 325 and one or more I/O ports 327. Transceiver 325 and I/O ports 327 may provide a network interface. The term "network" is herein used broadly to connote wired or wireless networks of computers or telecommunications devices (such as wired or wireless telephones, tablets, etc.). For example, a computer network may be a local area network (LAN) or a wide area network (WAN). When used in a LAN networking environment, computers may be connected to the LAN through a network interface or adapter; for example, a supervisor may establish communication with control system 112 using a tablet that wirelessly joins the network. When used in a WAN networking environment, computers typically include a modem or other communication mechanism. Modems may be internal or external and may be connected to the system bus via the user-input interface, or other appropriate mechanism. Networked computers may be connected over the Internet, an Intranet, Extranet, Ethernet, or any other system that provides communications. Some suitable communications protocols include TCP/IP, UDP, or OSI, for example. For wireless communications, communications protocols may include IEEE 802.11x ("Wi-Fi"), Bluetooth, ZigBee, IrDa, near-field communication (NFC), or other suitable protocol. Furthermore, components of the system may communicate through a combination of wired or wireless paths, and communication may involve both computer and telecommunications networks.

CPU 305 is typically a microprocessor, but in various embodiments may be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), PLD (programmable logic device), PLA (programmable logic array), RFID processor, graphics processing unit (GPU), smart chip, or any other device or arrangement of devices that is capable of implementing the steps of the processes of the invention.

The system memory 310 contains a series of frame buffers 335, i.e., partitions that store, in digital form (e.g., as pixels or voxels, or as depth maps), images obtained by the sensors 102; the data may actually arrive via I/O ports 327 and/or transceiver 325 as discussed above. System memory 310 contains instructions, conceptually illustrated as a group of modules, that control the operation of CPU 305 and its interaction with the other hardware components. An operating system 340 (e.g., Windows or Linux) directs the execution of low-level, basic system functions such as memory allocation, file management and operation of mass storage device 312. At a higher level, and as described in greater detail below, an analysis module 342 registers the images in frame buffers 335 and analyzes them to classify regions of the monitored workspace 100. The result of the classification may be stored in a space map 345, which contains a volumetric representation of the workspace 100 with each voxel (or other unit of representation) labeled, within the space map, as described herein. Alternatively, space map 345 may simply be a 3D array of voxels, with voxel labels being stored in a separate database (in memory 310 or in mass storage 312).

Control system 112 may also control the operation or machinery in the workspace 100 using conventional control routines collectively indicated at 350. As explained below, the configuration of the workspace and, consequently, the classifications associated with its voxel representation may well change over time as persons and/or machines move about, and control routines 350 may be responsive to these changes in operating machinery to achieve high levels of safety. All of the modules in system memory 310 may be programmed in any suitable programming language, including, without limitation, high-level languages such as C, C++, C#, Ada, Basic, Cobra, Fortran, Java, Lisp, Perl, Python, Ruby, or low-level assembly languages.

1.1 Sensor Registration

In a typical multi-sensor system, the precise location of each sensor 102 with respect to all other sensors is established during setup. Sensor registration is usually performed automatically and should be as simple as possible to allow for ease of setup and reconfiguration. Assuming for simplicity that each frame buffer 335 stores an image (which may be refreshed periodically) from a particular sensor 102, analysis module 342 may register sensors 102 by comparing all or part of the image from each sensor to the images from other sensors in frame buffers 335 and using conventional computer-vision techniques to identify correspondences in those images. Suitable global-registration algorithms, which do not require an initial registration approximation, generally fall into two categories: feature-based methods and intensity-based methods. Feature-based methods identify correspondences between image features such as edges while intensity-based methods use correlation metrics between intensity patterns. Once an approximate registration is identified, an Iterative Closest Point (ICP) algorithm or suitable variant thereof may be used to fine-tune the registration.

If there is sufficient overlap between the fields of view of the various sensors 102, and sufficient detail in the workspace 100 to provide distinct sensor images, it may be sufficient to compare images of the static workspace. If this is not the case, a "registration object" having a distinctive signature in 3D can be placed in a location within workspace 100 where it can be seen by all sensors. Alternatively, registration can be achieved by having the sensors 102 record images of one or more people standing in the workspace or walking throughout the workspace over a period of time, combining a sufficient number of partially matching images until accurate registration is achieved.

Registration to machinery within the workspace 100 can, in some cases, be achieved without any additional instrumentation, especially if the machinery has a distinctive 3D shape (for example, a robot arm), so long as the machinery is visible to at least one sensor registered with respect to the others. Alternatively, a registration object can be used, or a user interface, shown in display 320 and displaying the scene observed by the sensors, may allow a user to designate certain parts of the image as key elements of the machinery under control. In some embodiments, the interface provides an interactive 3D display that shows the coverage of all sensors to aid in configuration. If the system is be configured with some degree of high-level information about the machinery being controlled (for purposes of control routines 350, for example)—such as the location(s) of dangerous part or parts of the machinery and the stopping time and/or distance—analysis module 342 may be configured to provide intelligent feedback as to whether the sensors are providing sufficient coverage and suggest placement for additional sensors.

For example, analysis module 342 can be programmed to determine the minimum distance from the observed machinery at which it must detect a person in order to stop the machinery by the time the person reaches it (or a safety zone around it), given conservative estimates of walking speed. (Alternatively, the required detection distance can be input directly into the system via display 320.) Optionally, analysis module 342 can then analyze the fields of view of all sensors to determine whether the space is sufficiently covered to detect all approaches. If the sensor coverage is insufficient, analysis module 342 can propose new locations for existing sensors, or locations for additional sensors, that would remedy the deficiency. Otherwise, the control system will default to a safe state and control routines 350 will not permit machinery to operate unless analysis module 342 verifies that all approaches can be monitored effectively. Use of machine learning and genetic or evolutionary algorithms can be used to determine optimal sensor placement within a cell. Parameters to optimize include but are not limited to minimizing occlusions around the robot during operation and observability of the robot and workpieces.

If desired, this static analysis may include "background" subtraction. During an initial startup period, when it may be safely assumed there no objects intruding into the workspace 100, analysis module 342 identifies all voxels occupied by the static elements. Those elements can then be subtracted from future measurements and not considered as potential intruding objects. Nonetheless, continuous monitoring is performed to ensure that the observed background image is consistent with the space map 345 stored during the startup period. Background can also be updated if stationary objects are removed or are added to the workspace There may be some areas that sensors 102 cannot observe sufficiently to provide safety, but that are guarded by other methods such as cages, etc. In this case, the user interface can allow the user to designate these areas as safe, overriding the sensor-based safety analysis. Safety-rated soft-axis and rate limitations can also be used to limit the envelope of the robot to improve performance of the system.

Once registration has been achieved, sensors 102 should remain in the same location and orientation while the workspace 100 is monitored. If one or more sensors 102 are accidentally moved, the resulting control outputs will be invalid and could result in a safety hazard. Analysis module 342 may extend the algorithms used for initial registration to monitor continued accuracy of registration. For example, during initial registration analysis module 342 may compute a metric capturing the accuracy of fit of the observed data to a model of the work cell static elements that is captured during the registration process. As the system operates, the same metric can be recalculated. If at any time that metric exceeds a specified threshold, the registration is considered to be invalid and an error condition is triggered; in response, if any machinery is operating, a control routine 350 may halt it or transition the machinery to a safe state.

1.2 Identifying Occupied and Potentially Occupied Areas

Once the sensors have been registered, control system 112 periodically updates space map 345—at a high fixed frequency (e.g., every analysis cycle) in order to be able to identify all intrusions into workspace 100. Space map 345 reflects a fusion of data from some or all of the sensors 102. But given the nature of 3D data, depending on the locations of the sensors 102 and the configuration of workspace 100, it is possible that an object in one location will occlude the sensor's view of objects in other locations, including objects (which may include people or parts of people, e.g., arms) that are closer to the dangerous machinery than the occluding object. Therefore, to provide a reliably safe system, the system monitors occluded space as well as occupied space.

In one embodiment, space map 345 is a voxel grid. In general, each voxel may be marked as occupied, unoccupied or unknown; only empty space can ultimately be considered safe, and only when any additional safety criteria—e.g., minimum distance from a piece of controlled machinery—is satisfied. Raw data from each sensor is analyzed to determine whether, for each voxel, an object or boundary of the 3D mapped space has been definitively detected in the volume corresponding to that voxel. To enhance safety, analysis module 342 may designate as empty only voxels that are observed to be empty by more than one sensor 102. Again, all space that cannot be confirmed as empty is marked as unknown. Thus, only space between a sensor 102 and a detected object or mapped 3D space boundary along a ray may be marked as empty.

If a sensor detects anything in a given voxel, all voxels that lie on the ray beginning at the focal point of that sensor and passing through the occupied voxel, and which are between the focal point and the occupied voxel, are classified as unoccupied, while all voxels that lie beyond the occupied voxel on that ray are classified as occluded for that sensor; all such occluded voxels are considered "unknown." Information from all sensors may be combined to determine which areas are occluded from all sensors; these areas are considered unknown and therefore unsafe. Analysis module 342 may finally mark as "unoccupied" only voxels or workspace volumes that have been preliminarily marked at least once (or, in some embodiments, at least twice) as "unoccupied." Based on the markings associated with the voxels or discrete volumes within the workspace, analysis module 342 may map one or more safe volumetric zones within space map 345. These safe zones are outside a safety zone of the machinery and include only voxels or workspace volumes marked as unoccupied.

A common failure mode of active optical sensors that depend on reflection, such as LIDAR and time-of-flight cameras, is that they do not return any signal from surfaces that are insufficiently reflective, and/or when the angle of incidence between the sensor and the surface is too shallow. This can lead to a dangerous failure because this signal can be indistinguishable from the result that is returned if no obstacle is encountered; the sensor, in other words, will report an empty voxel despite the possible presence of an obstacle. This is why ISO standards for e.g., 2D LIDAR sensors have specifications for the minimum reflectivity of objects that must be detected; however, these reflectivity standards can be difficult to meet for some 3D sensor modalities such as ToF. In order to mitigate this failure mode, analysis module 342 marks space as empty only if some obstacle is definitively detected at further range along the same ray. By pointing sensors slightly downward so that most of the rays will encounter the floor if no obstacles are present, it is possible to conclusively analyze most of the workspace 100. But if the sensed light level in a given voxel is insufficient to definitively establish emptiness or the presence of a boundary, the voxel is marked as unknown. The signal and threshold value may depend on the type of sensor being used. In the case of an intensity-based 3D sensor (for example, a time-of-flight camera) the threshold value can be a signal intensity, which may be attenuated by objects in the workspace of low reflectivity. In the case of a stereo vision system, the threshold may be the ability to resolve individual objects in the field of view. Other signal and threshold value combinations can be utilized depending on the type of sensor used.

A safe system can be created by treating all unknown space as though it were occupied. However, in some cases this may be overly conservative and result in poor performance. It is therefore desirable to further classify unknown space according to whether it could potentially be occupied. As a person moves within a 3D space, he or she will typically occlude some areas from some sensors, resulting in areas of space that are temporarily unknown (see FIG. 1). Additionally, moving machinery such as an industrial robot arm can also temporarily occlude some areas. When the person or machinery moves to a different location, one or more sensors will once again be able to observe the unknown space and return it to the confirmed-empty state in which it is safe for the robot or machine to operate. Accordingly, in some embodiments, space may also be classified as "potentially occupied." Unknown space is considered potentially occupied when a condition arises where unknown space could be occupied. This could occur when unknown space is adjacent to entry points to the workspace or if unknown space is adjacent to occupied or potentially occupied space. The potentially occupied space "infects" unknown space at a rate that is representative of a human moving through the workspace. Potentially occupied space stays potentially occupied until it is observed to be empty. For safety purposes, potentially occupied space is treated the same as occupied space. It may be desirable to use probabilistic techniques such as those based on Bayesian filtering to determine the state of each voxel, allowing the system to combine data from multiple samples to provide higher levels of confidence in the results. Suitable models of human movement, including predicted speeds (e.g., an arm may be raised faster than a person can walk), are readily available.

2. Classifying Objects

For many applications, the classification of regions in a workspace as described above may be sufficient—e.g., if control system 112 is monitoring space in which there should be no objects at all during normal operation. In many cases, however, it is desirable to monitor an area in which there are at least some objects during normal operation, such as one or more machines and workpieces on which the machine is operating. In these cases, analysis module 342 may be configured to identify intruding objects that are unexpected or that may be humans. One suitable approach to such classification is to cluster individual occupied voxels into objects that can be analyzed at a higher level.

To achieve this, analysis module 342 may implement any of several conventional, well-known clustering techniques such as Euclidean clustering, K-means clustering and Gibbs-sampling clustering. Any of these or similar algorithms can be used to identify clusters of occupied voxels from 3D point cloud data. Mesh techniques, which determine a mesh that best fits the point-cloud data and then use the mesh shape to determine optimal clustering, may also be used. Once identified, these clusters can be useful in various ways.

One simple way clustering can be used is to eliminate small groups of occupied or potentially occupied voxels that are too small to possibly contain a person. Such small clusters may arise from occupation and occlusion analysis, as described above, and can otherwise cause control system 112 to incorrectly identify a hazard. Clusters can be tracked over time by simply associating identified clusters in each image frame with nearby clusters in previous frames or using more sophisticated image-processing techniques. The shape, size, or other features of a cluster can be identified and tracked from one frame to the next. Such features can be used to confirm associations between clusters from frame to frame, or to identify the motion of a cluster. This information can be used to enhance or enable some of the classification techniques described below. Additionally, tracking clusters of points can be employed to identify incorrect and thus potentially hazardous situations. For example, a cluster that was not present in previous frames and is not close to a known border of the field of view may indicate an error condition.

In some cases, it may be sufficient filter out clusters below a certain size and to identify cluster transitions that indicate error states. In other cases, however, it may be necessary to further classify objects into one or more of four categories: (1) elements of the machinery being controlled by system 112, (2) the workpiece or workpieces that the machinery is operating on, and (3) other foreign objects, including people, that may be moving in unpredictable ways and that can be harmed by the machinery. It may or may not be necessary to conclusively classify people versus other unknown foreign objects. It may be necessary to definitively identify elements of the machinery as such, because by definition these will always be in a state of "collision" with the machinery itself and thus will cause the system to erroneously stop the machinery if detected and not properly classified. Similarly, machinery typically comes into contact with workpieces, but it is typically hazardous for machinery to come into contact with people. Therefore, analysis module 342 should be able to distinguish between workpieces and unknown foreign objects, especially people.

Elements of the machinery itself may be handled for classification purposes by the optional background-subtraction calibration step described above. In cases where the machinery changes shape, elements of the machinery can be identified and classified, e.g., by supplying analysis module 342 with information about these elements (e.g., as scalable 3D representations), and in some cases (such as industrial robot arms) providing a source of instantaneous information about the state of the machinery. Analysis module 342 may be "trained" by operating machinery, conveyors, etc. in isolation under observation by the sensors 102, allowing analysis module 342 to learn their precise regions of operation resulting from execution of the full repertoire of motions and poses. Analysis module 342 may classify the resulting spatial regions as occupied.

Conventional computer-vision techniques may be employed to enable analysis module 342 to distinguish between workpieces and humans. These include deep learning, a branch of machine learning designed to use higher levels of abstraction in data. The most successful of these deep-learning algorithms have been convolutional neural networks (CNNs) and more recently recurrent neural networks (RNNs). However, such techniques are generally employed in situations where accidental misidentification of a human as a non-human does not cause safety hazards. In order to use such techniques in the present environment, a number of modifications may be needed. First, machine-learning algorithms can generally be tuned to prefer false positives or false negatives (for example, logistic regression can be tuned for high specificity and low sensitivity). False positives in this scenario do not create a safety hazard—if the robot mistakes a workpiece for a human, it will react conservatively. Additionally, multiple algorithms or neural networks based on different image properties can be used, promoting the diversity that may be key to achieving sufficient reliability for safety ratings. One particularly valuable source of diversity can be obtained by using sensors that provide both 3D and 2D image data of the same object. If any one technique identifies an object as human, the object will be treated as human. Using multiple techniques or machine-learning algorithms, all tuned to favor false positives over false negatives, sufficient reliability can be achieved. In addition, multiple images can be tracked over time, further enhancing reliability—and again every object can be treated as human until enough identifications have characterized it as non-human to achieve reliability metrics. Essentially, this diverse algorithmic approach, rather than identifying humans, identifies things that are definitely not humans.

In addition to combining classification techniques, it is possible to identify workpieces in ways that do not rely on any type of human classification at all. One approach is to configure the system by providing models of workpieces. For example, a "teaching" step in system configuration may simply supply images or key features of a workpiece to analysis module 342, which searches for matching configurations in space map 345, or may instead involving training of a neural network to automatically classify workpieces as such in the space map. In either case, only objects that accurately match the stored model are treated as workpieces, while all other objects are treated as humans.

Another suitable approach is to specify particular regions within the workspace, as represented in the space map 345, where workpieces will enter (such as the top of a conveyor belt). Only objects that enter the workspace in that location are eligible for treatment as workpieces. The workpieces can then be modeled and tracked from the time they enter the workspace until the time they leave. While a monitored machine such as a robot is handling a workpiece, control system 112 ensures that the workpiece is moving only in a manner consistent with the expected motion of the robot end effector. Known equipment such as conveyor belts can also be modeled in this manner. Humans may be forbidden from entering the work cell in the manner of a workpiece—e.g., sitting on conveyors.

All of these techniques can be used separately or in combination, depending on design requirements and environmental constraints. In all cases, however, there may be situations where analysis module 342 loses track of whether an identified object is a workpiece. In these situations the system should to fall back to a safe state. An interlock can then be placed in a safe area of the workspace where a human worker can confirm that no foreign objects are present, allowing the system to resume operation.

In some situations a foreign object enters the workspace, but subsequently should be ignored or treated as a workpiece. For example, a stack of boxes that was not present in the workspace at configuration time may subsequently be placed therein. This type of situation, which will become more common as flexible systems replace fixed guarding, may be addressed by providing a user interface (e.g., shown in display 320 or on a device in wireless communication with control system 112) that allows a human worker to designate the new object as safe for future interaction. Of course, analysis module 342 and control routines 350 may still act to prevent the machinery from colliding with the new object, but the new object will not be treated as a potentially human object that could move towards the machinery, thus allowing the system to handle it in a less conservative manner.

3. Generating Control Outputs

At this stage, analysis module 342 has identified all objects in the monitored area 100 that must be considered for safety purposes. Given this data, a variety of actions can be taken and control outputs generated. During static calibration or with the workspace in a default configuration free of humans, space map 345 may be useful to a human for evaluating sensor coverage, the configuration of deployed machinery, and opportunities for unwanted interaction between humans and machines. Even without setting up cages or fixed guards, the overall workspace layout may be improved by channeling or encouraging human movement through the regions marked as safe zones, as described above, and away from regions with poor sensor coverage.

Control routines 350, responsive to analysis module 342, may generate control signals to operating machinery, such as robots, within workspace 100 when certain conditions are detected. This control can be binary, indicating either safe or unsafe conditions, or can be more complex, such as an indication of what actions are safe and unsafe. The simplest type of control signal is a binary signal indicating whether an intrusion of either occupied or potentially occupied volume is detected in a particular zone. In the simplest case, there is a single intrusion zone and control system 112 provides a single output indicative of an intrusion. This output can be delivered, for example, via an I/O port 327 to a complementary port on the controlled machinery to stop or limit the operation of the machinery. In more complex scenarios, multiple zones are monitored separately, and a control routine 350 issues a digital output via an I/O port 327 or transceiver 325 addressed, over a network, to a target piece of machinery (e.g., using the Internet protocol or other suitable addressing scheme).

Another condition that may be monitored is the distance between any object in the workspace and a machine, comparable to the output of a 2D proximity sensor. This may be converted into a binary output by establishing a proximity threshold below which the output should be asserted. It may also be desirable for the system to record and make available the location and extent of the object closest to the machine. In other applications, such as a safety system for a collaborative industrial robot, the desired control output may include the location, shape, and extent of all objects observed within the area covered by the sensors 102.

4. Safe Action Constraints and Dynamic Determination of Safe Zones

ISO 10218 and ISO/TS 15066 describe speed and separation monitoring (SSM) as a safety mode that can enable collaboration between an industrial robot and a human worker. Risk reduction is achieved by maintaining at least a protective separation distance between the human worker and the robot during periods of robot motion. This protective separation distance is calculated using information including robot and human worker position and movement, robot stopping distance, measurement uncertainty, system latency and system control frequency. When the calculated separation distance decreases to a value below the protective separation distance, the robot system is safely slowed or stopped. This methodology can be generalized beyond industrial robotics to machinery and as described below, may be applied at an object level.

For convenience, the following discussion focuses on dynamically defining a safe zone around a robot operating in the workspace 100. It should be understood, however, that the techniques described herein apply not only to multiple robots but to any form of machinery that can be dangerous when approached too closely, and which has a minimum safe separation distance that may vary over time and with particular activities undertaken by the machine. As described above, a sensor array obtains sufficient image information to characterize, in 3D, the robot and the location and extent of all relevant entities in the area surrounding the robot at each analysis cycle. (Each analysis cycle includes image capture, refresh of the frame buffers, and computational analysis; accordingly, although the period of the analysis or control cycle is short enough for effective monitoring to occur in real time, it involves many computer clock cycles.) Analysis module 342 utilizes this information along with instantaneous information about the current state of the robot at each cycle to determine instantaneous, current safe action constraints for the robot's motion. The constraints may be communicated to the robot, either directly by analysis module 342 or via a control routine 350, to the robot via transceiver 325 and/or I/O port 327.

5. Object Representation

Non-human entities—boxes, workpieces, static or movable machinery, etc.—may be defined as objects in an object-oriented programming environment, through the use of a relational or other object database or using other computational modes of classification. In all cases, a computational object reflects a semantic understanding of the real-world entity to which it refers. An object may contain a profile, comprising a series of attributes defining key parameters of the modeled entity, and methods associated with its handling or use. In an object-oriented implementation, a data structure corresponding to the object class includes class and instance variables that define object attributes, and methods that define functions that assist the computational representation of the physical entity and/or workspace and may govern interactions among entities (and their computational representations). Similar capabilities may be achieved using a database or classification scheme with, for example, each entity represented as a row with attributes or pointers to methods in the corresponding column cells. For convenience, the ensuing discussion will presume an object-oriented representation. An entity such as a carton, for example, may include class variables such as dimensions and location, which are common to all carton objects.

Objects may be hierarchically organized so that a carton may become part of a collection of cartons, e.g., a stack object. When two carton objects come into contact or proximity, an internal (class or instance) method of one of them may generate the stack object and remove it if the added carton is later moved; alternatively, the object-monitoring system may generate the hierarchically superior object. The object variables and methods may be unique to the particular object and reflect a semantic understanding of its physical nature. Critically, an object may include a parameter defining a minimum separation distance, if any, from a robot. For example, for an inanimate carton, this variable may merely indicate that a robot should not collide with, but can touch, the carton—i.e., the protective safety distance may be defined as zero. For a human, on the other hand, the protective safety distance may be large and may vary depending on predicted motion of the human—a prediction that may, for example, be generated by a method internal to the object representing the human based on the current sensor-obtained image of the human. In the most conservative model, the human is assumed to be able to move at a set speed directly towards the robot or hazard.

Figure 4A:
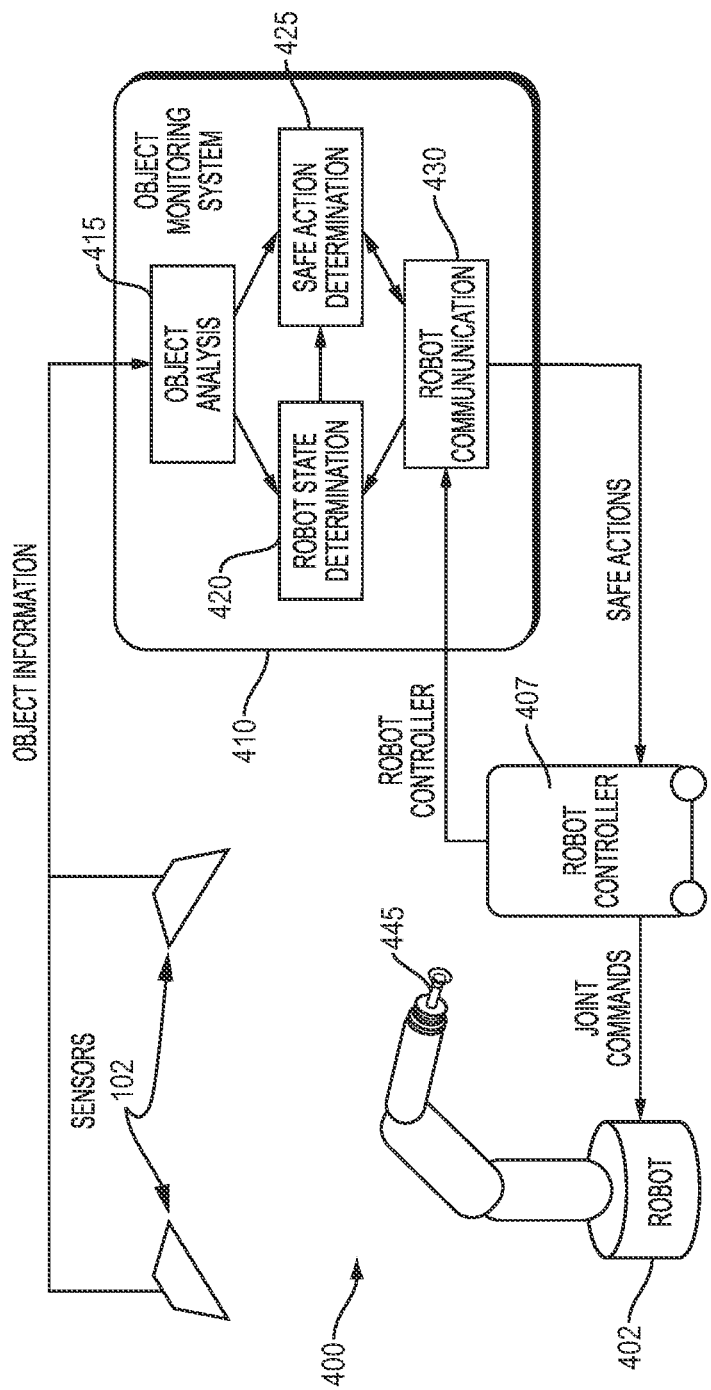
FIG. 4A schematically illustrates an object-monitoring system in accordance with an embodiment of the invention.
Figure 4B:
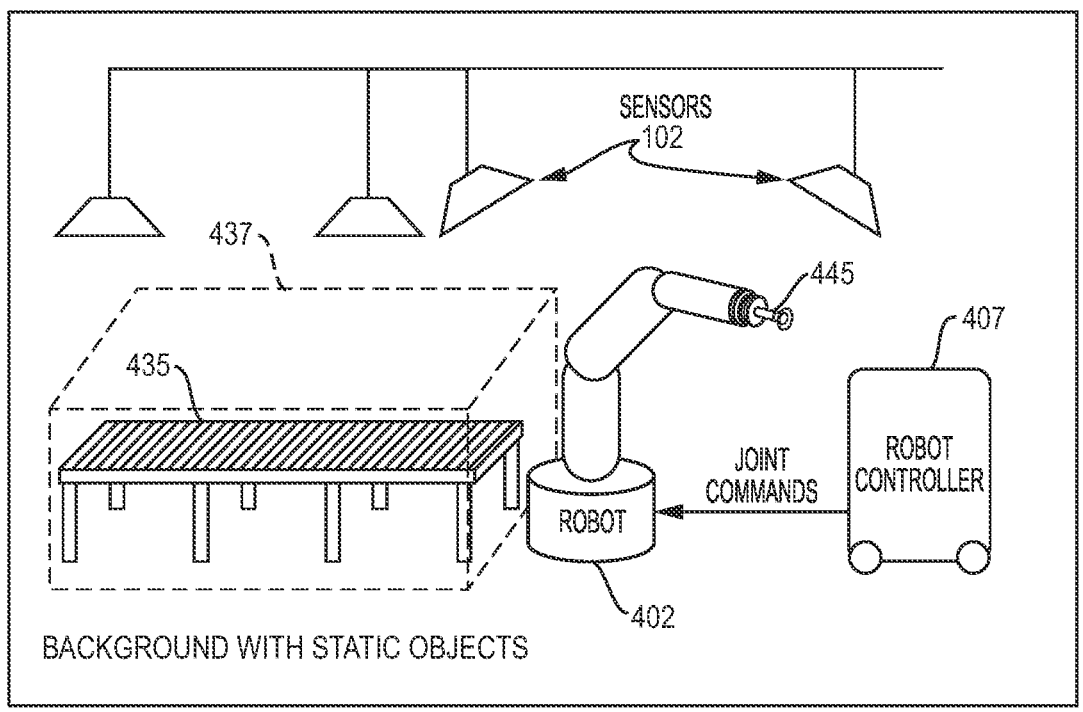
FIGS. 4B-4H illustrate a process for object definition and the use of objects in enforcing safety constraints in accordance with an embodiment of the invention.

The operation of the system is best understood with reference to the conceptual illustration of system organization and operation of FIG. 4A. As described above, a sensor array 102 monitors the workspace 400, which includes a robot 402 with a vacuum-gripper end effector 445. The robot's movements are controlled by a conventional robot controller 407, which may be part of or separate from the robot itself; for example, a single robot controller may issue commands to more than one robot. The robot's activities may primarily involve a robot arm, the movements of which are orchestrated by robot controller 407 using joint commands that operate the robot arm joints to effect a desired movement. An object-monitoring system (OMS) 410 obtains workspace images from the sensors 102 and uses these to identify relevant physical entities in the workspace 400, thereupon generating computational objects representing the identified physical entities. As shown in FIG. 4B, for example, the detected entities may include a conveyor 435 and the robot 402. Identifying the robot 402 allows OMS 410 to generate a robot object representing the specific robot 402 and populate its class and instance variables to specify, for example, its geometry and kinematic capabilities. These may be used by robot controller 407 when enforcing protective separation distances involving humans and non-human entities in the workspace.

OMS 410 communicates with robot controller 407 via any suitable wired or wireless protocol. (In an industrial robot, control electronics typically reside in an external control box. However, in the case of a robot with a built-in controller, OMS 410 communicates directly with the robot's onboard controller.) Using information obtained from robot 402 (and, typically, sensors 102), OMS 410 determines the robot's current state. Based on parameter values specified in the robot object, OMS 410 determines safe-action constraints for robot 402 given the robot's identity, current state and all identified physical entities that robot 402 could reach within a defined time slice determined, for example, by the robot's kinematics and the velocities and identities of nearby objects. Finally, OMS 410 communicates the safe action constraints to robot 407. (It will be appreciated that, with reference to FIG. 3, the functions of OMS 410 are performed in a control system 112 by analysis module 342 and, in some cases, a control routine 350.)

The robot "state" typically specifies instantaneous position, pose, and/or velocity—of the entire robot and, in some embodiments, of the end effector as well. From these state variables, internal states may be inferred; for example, if the gripper of a particular end effector is open, it can be inferred that power is being applied to the end effector (corresponding to a "power on" state). Knowledge of the robot's kinematics can be used to infer a continuous state from these instantaneous state variables. For example, the instantaneous position and velocity of the robot can be used to predict a future position assuming no change in velocity. Similarly, the instantaneous joint positions associated with the pose and the velocity of the end effector can be used to predict a future end-effector state. The state of an end effector may also include the size and/or weight of a workpiece, which can affect kinematics and maintenance of a safe distance from inanimate entities and humans.

The sensors 102 provide real-time image information that is analyzed by an object-analysis module 415 at a fixed frequency in the manner discussed above; in particular, at each cycle, object analysis module 415 identifies the precise 3D location and extent of all entities in workspace 400 that are either within the robot's reach or that could move into the robot's reach at conservative expected velocities. If not all of the relevant volume is within the collective field of view of the sensors 102, OMS 410 may be configured to so determine and indicate the location and extent of all fixed entities within that region (or a conservative superset of those objects) and/or verify that other guarding techniques have been used to prevent access to unmonitored areas that are not entry points. That is, a workspace may have a plurality of entry points, not all of which are necessarily monitored; an operator may, for example, enter the workspace 400 via an unguarded entry point (which may also be unmonitored). When the sensors 102 detect the presence of an object (which could be the entering operator), object-analysis module 415 assumes the object is a human and computes a trajectory and based thereon, a minimum estimated time before the entering operator could come within an unsafe distance of robot 402.

Object analysis module 415 can be trained to recognize and identify static entities, and instantiate appropriate objects representing them, by physically positioning a representative entity in the monitored zone where the sensors are actively monitoring the space. By subtracting a trained nominal background image from frames where the entity is also present, object analysis module 415 performs segmentation and voxel-grid dissection to distinguish the entity from the background.

Beginning with a 3D voxel-grid volumetric representation of a space, a series of image-capturing steps may be used to successfully train object analysis module 415 to recognize static entities. Object analysis module 415 may further be trained to recognize a location of a properly oriented entity, e.g., the position and orientation of a workpiece. During training, the user sets workpieces in their proper positions and orientations and signals approval; the image recorded by each sensor 102 is saved in memory as a comparison template associated with the specific type of workpiece (which is represented as an object). If multiple workpieces are processed (or their positions and orientations evaluated) simultaneously, the collection of objects may be approved and stored. Further details concerning methodologies for object identification and tracking are discussed below.

After being saved into memory, objects and collections of objects may be recalled for additional editing and reclassification steps. Basic Boolean operations to combine bodies may be performed in addition to more complex addition and subtraction of individual voxels using a conventional CAD modeling tool. An offsetting tool may be used to adjust the boundary of a represented entity by a configurable number of voxels. This boundary offsetting step may be performed to account, for example, for multiple variants, part-to-part tolerance stack up or variance, or to influence the sensitivity of object analysis module 415 to the sensed entity or entities. Alternatively, conventional techniques of image data augmentation can be employed to translate and rotate by small amounts the entity images captured by the different sensors, thereby establishing the range of acceptable variations in position and orientation.

The digital model may include representations of multiple discrete, sequential states; in the limit, these states may form a video sequence of frames recorded as, for example, a workpiece moves through a production step. For example, a user interface may allow the user to pause the recording at any time and choose to record the current state of the workpiece into memory as a discrete object. An alternative option in the continuous mode is to allow the object to change in real time based on the recorded data.

A representative process for object definition and the use of objects in enforcing safety constraints is illustrated in FIGS. 4B-4H for a palletizing application. In this sequential imaging process, visual understandings of the background and workpieces are developed separately. With reference to FIG. 4B, the sensors 102 capture an image of the static background including a conveyor 435, as well as robot 102 and its end effector 445. A provisional safe zone 437 may be defined by the user around the conveyor 435 in order to simplify monitoring. Within the safe zone 437, workpieces or finished goods of various sizes and shapes may be transported by the conveyor 435 for handling by the robot 402. The provisional safe zone 437 reflects a high degree of confidence that humans will not enter the zone—for example, the conveyor may be surrounded by a barrier—and that entities therein need not be catalogued and monitored. Accordingly, while the provisional safe zone 437 remains in existence, the volume it encloses is considered empty and it is not monitored. The zone 437 may be defined manually (e.g., by user manipulation of a touch display) or automatically (e.g., proposed to an operator for approval or revision via a user interface upon recognition, by object analysis module 415, of a conveyor object). The zone 437 is "provisional" in that it can be manually cleared by the operator in the manner in which it was defined or may be cleared or reduced in extent upon entry into the zone 437 of a human or upon other potentially dangerous conditions. For example, zone 437 may be defined and monitored as an object by OMS 410 and cleared when object analysis module 415 detects occupied or potentially occupied voxels within the provisional safe zone.

Figure 4C:
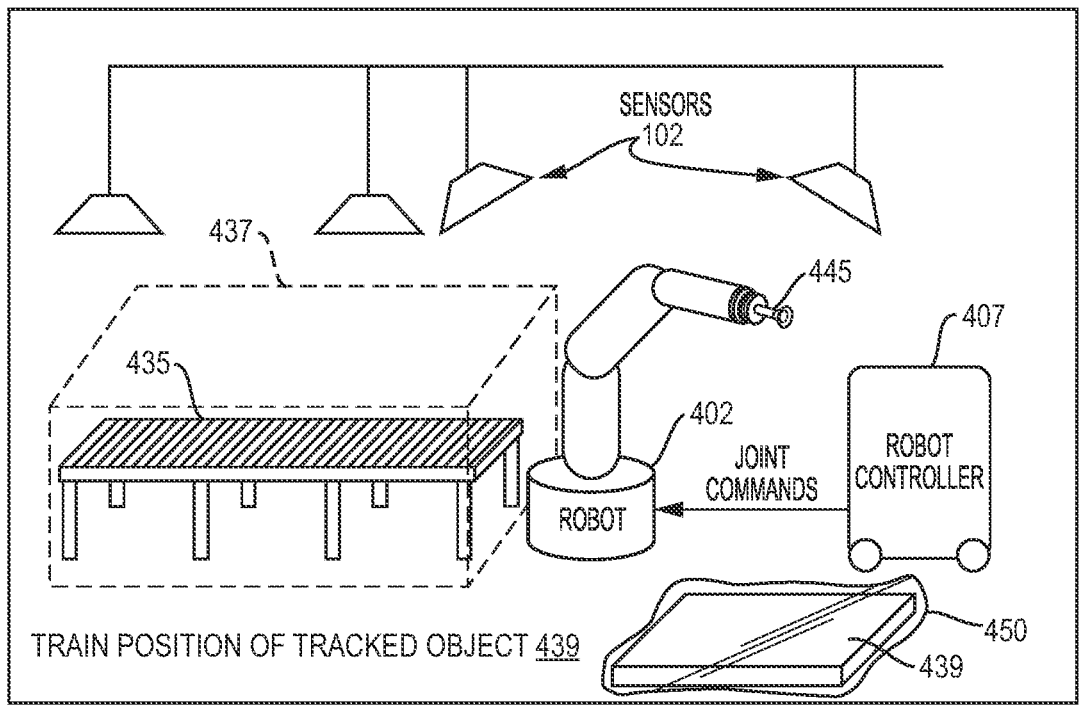

In FIG. 4C, a pallet 439 is placed in position and the sensors 102 obtain new images of the tracked area. Using background subtraction from the first image, the voxel representation of the pallet 439 is identified and saved into memory 310. Object analysis module 415 recognizes the voxel representation as a pallet and creates and stores, in main memory 310, a pallet object. Alternatively, object analysis module 415 may immediately recognize the pallet 439 as such based on similarity to pre-stored images. The spatial extent of the pallet 439 is stored as an internal parameter value of the object representing the pallet and is indicated conceptually at 450.

Figure 4D:
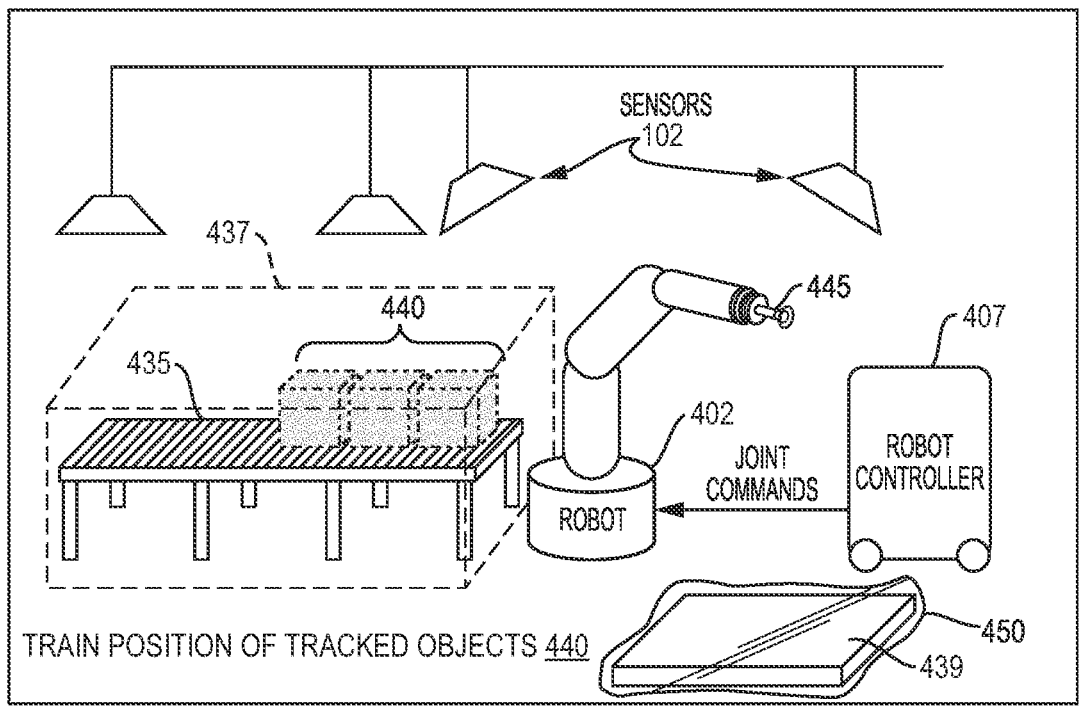

In FIG. 4D, three cartons 440 have appeared on conveyor 435. Because they are within provisional safe zone 437, they are not tracked for safety purposes, but may be recognized as cartons based on images acquired by sensors 102, in which case object analysis module 415 may create and save carton objects to represent them. This may be done, for example, in order to ensure proper orientation for handling by robot 402. Thus, when cartons are transported on conveyor 435, they may not be recognized as in proper position until three boxes are aligned and positioned as shown in FIG. 4D. Until that occurs, robot controller 407 may prevent robot 402 from operating on the cartons 440, or may escalate the sensed condition to control system 112, which may take action beyond control of robot 402—e.g., stopping conveyor 435, issuing an alert, etc.

Figure 4E:
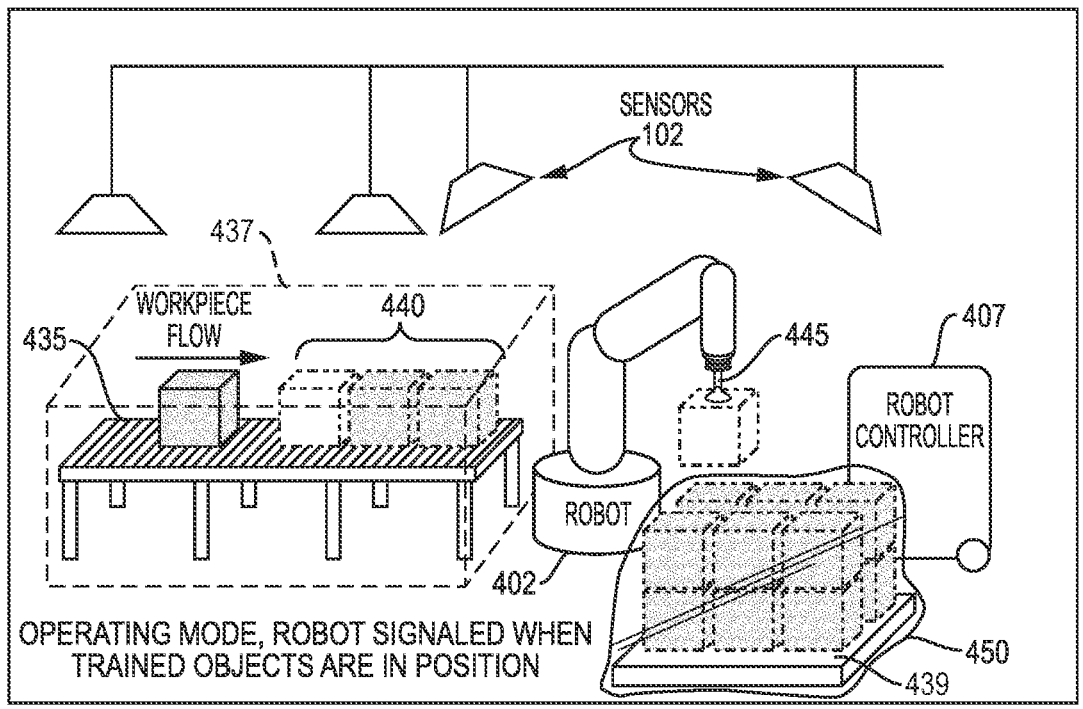

In FIG. 4E, robot 402 has moved a series of cartons 440 from conveyor 435 onto pallet 439. This may be handled by OMS 410 in various ways. In one implementation, the pallet object is configured for spatial extension—that is, pallets generally serve as a transportation platform for stacked entities such as cartons or work-in-process, so each time a carton 440 is placed on pallet 439, it may be viewed as increasing in spatial extent. In this implementation, the spatial extent parameter of the pallet object has increased as indicated at 450. Alternatively, or in addition, proximity or contact between two cartons may result in instantiation, either by object analysis module 415 or by one of the carton objects, of a "stack" object—i.e., a hierarchically superior object that includes or references the constituent carton objects. Defining a stack object may be beneficial because individual cartons can occlude other cartons as they are stacked; while occluded cartons cannot be individually tracked, the entire stack object is always visible and, for purposes of safety monitoring may represent the unit of greatest practical relevance.

Figure 4F:
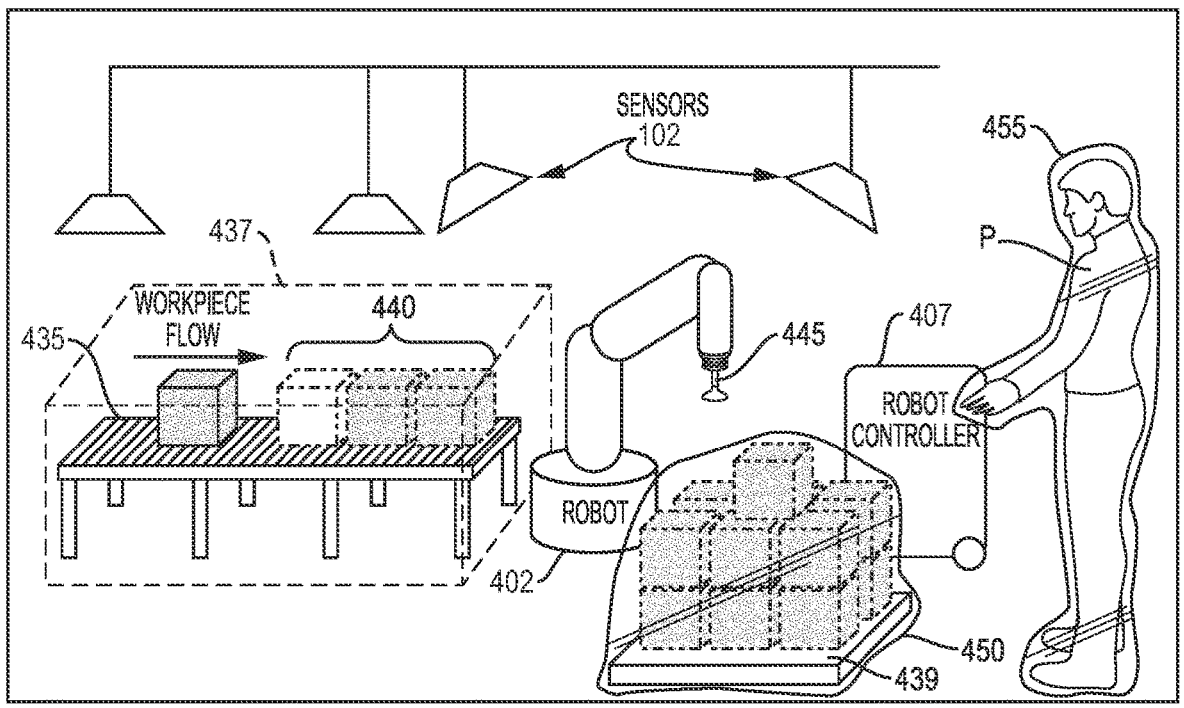

In FIG. 4F, a person P enters the workspace and is recognized as such by object analysis module 415 (or alternatively, is not recognized by object analysis module 415 and hence is treated as an "unrecognized object" to guard against), which generates a corresponding object with spatial extent instantaneously indicated at 455. The human object may include internal methods that model potential movements based on a current instantaneous state in order to enforce a protective separation distance as described below, or the human object is assumed, for safety purposes, to move arbitrarily with a set velocity in the direction of the hazard. With the workspace configuration shown in FIG. 4F, the robot 402 is free to continue to stack cartons 440 on the pallet 439 so long as the protective separation distance from the person P is maintained.

Figure 4G:
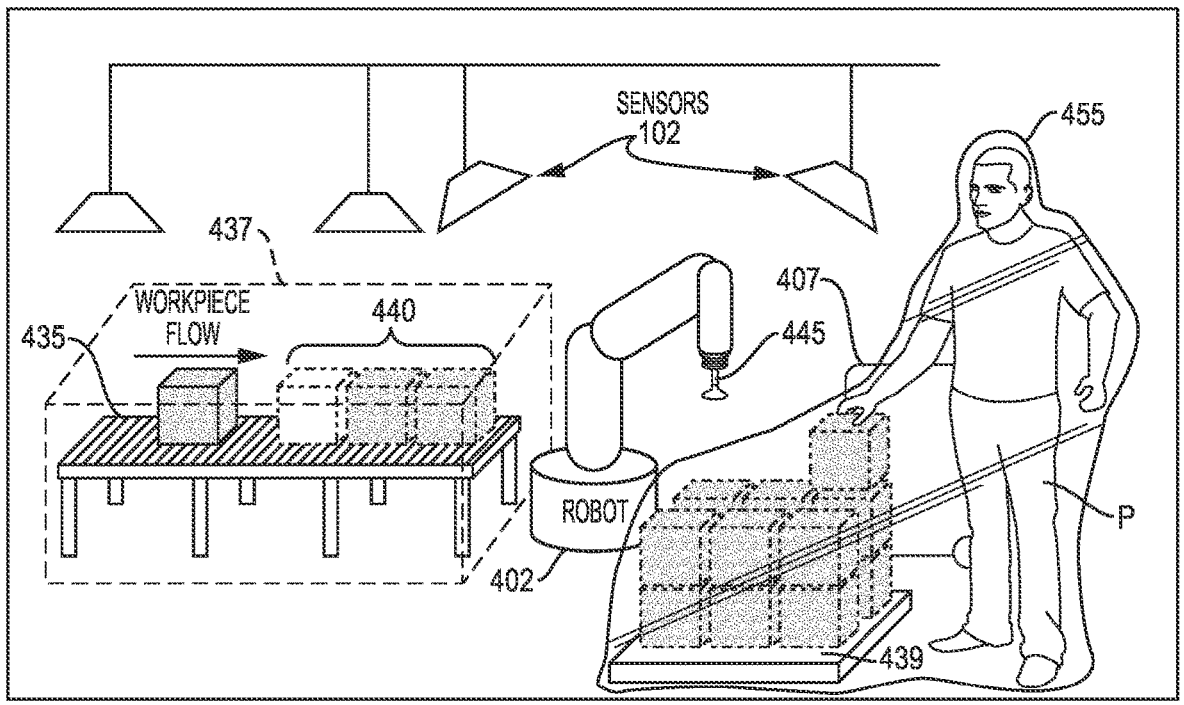

In FIG. 4G, when the person P makes contact with the cartons stacked on pallet 439, the pallet object (and, if it was generated, the stack object) is merged with the object representing the person P; in effect, the non-human objects disappear for as long as the person P makes contact with the stack of cartons, and the spatial extent 455 of the person P now extends beyond the human to encompass the entity with which he is in contact. As a result, the protective separation distance applicable to a human now governs the stacked cartons as well, restricting the robot's ability to stack further cartons. Attributes associated with the merged object may be selectively reset relative to the original objects. For example, in this case, the object associated with the person P survives the merger and the merged entity is categorized as human; it will have a set of attributes (e.g., relating to safe distances) associated with a human entity. The spatial extent of the merged object, however, corresponds to the combined entities.

Figure 4H:
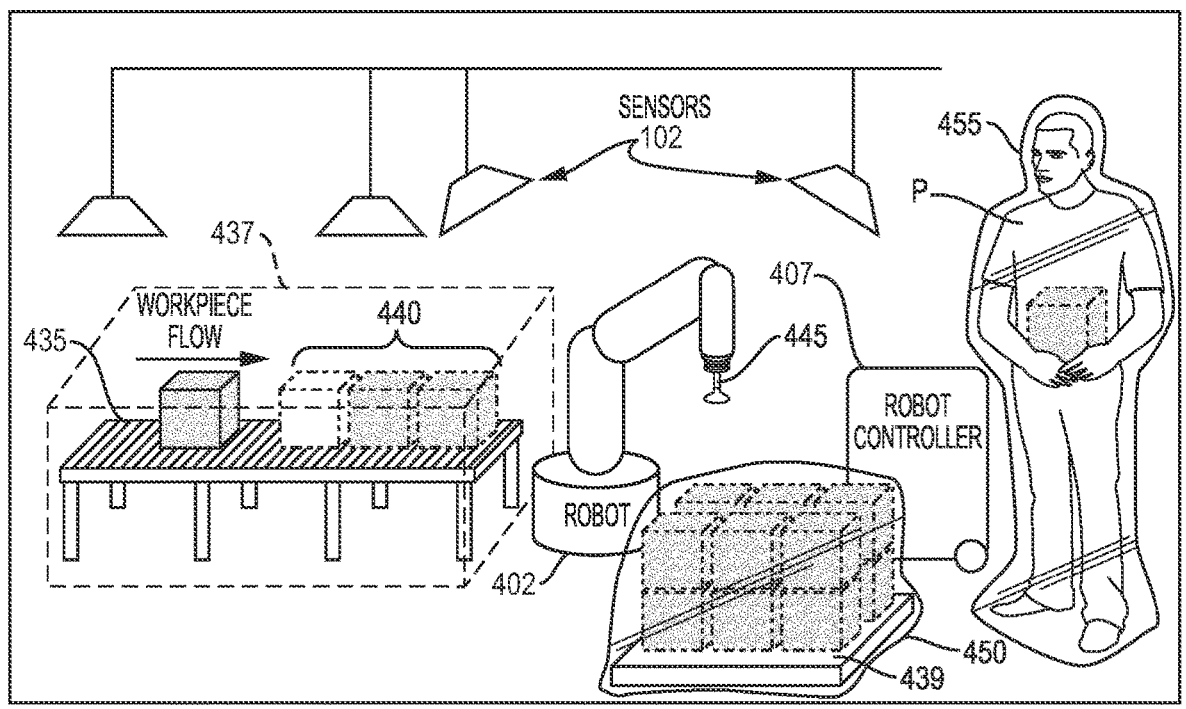

In FIG. 4H, the person P has removed one of the cartons from the stack. Since no part of the person P, including the carton he now holds, is in contact with the stacked cartons, the object corresponding to the person is once again distinct from that corresponding to the cartons stacked on pallet 439, and the spatial regions 450, 455 are now separate (though spatial region 455 now includes a carton). As a result, robot 402 may resume stacking cartons on pallet 439 so long as the prescribed protective separation distance from the person P, including the entire spatial extent 455, is maintained.

These automatic operations of object merging and dissociation may be replaced or overridden by operator intervention. For example, an operator may have a device connected to OMS 110 and displaying a view of workspace 400 obtained by the sensors 102; recognized objects in the displayed scene may be labeled (e.g., surrounded by color-coded boundaries). The operator may, via the device, manually cause objects—e.g., a human in the space and another entity—to be merged, or conversely, cause merged objects to dissociate. That is, the operator may override or reset associations created automatically as described above or cause the merger of objects that would otherwise remain separate. The operator may also modify specific attributes of the merged object. Alternatively, once the system has determined that person P and the pallet 439 have come in contact, the combination of person P and pallet 439 is considered human for safeguarding purposes even if they subsequently become physically separated again and can only be reset to separate objects by resetting through the device connected to OMS 110.

Moreover, the appearance of the person P, like the expected position and orientation of a workpiece, can be used for control purposes. For example, either the presence or absence of a person in a position to perform a task or subtask may necessitate interruption of processing. If, for example, the presence of an operator near conveyor 435 is necessary for safety or quality-control reasons, sensing of the operator's presence by OMS 410—i.e., recognition in the recorded workspace images of a person at the proper location within a tolerance—may be necessary before robot controller 407 is permitted to activate robot 402. Similarly, if OMS 410 senses departure of the person P from the prescribed location, OMS 410 may cause robot controller 407 to temporarily stop the robot 402 and/or may escalate the sensed condition to control system 112 for additional action.

6. Semantic Object Recognition and Tracking

As explained above, the recognition and tracking of objects within a monitored workspace can be carried out by OMS 110 using conventional computer-vision techniques without undue experimentation. It is possible, however, to incorporate other signals and inputs to improve the accuracy and reliability of the recognition and tracking. Typically, 3D sensors 102 may be time-of-flight (ToF) sensors that capture an image as well as an estimate, based on the time of flight of an emitted light (e.g., infrared (IR)) signal that strikes objects within the field of view and returns to the sensor, of the distance to the objects represented as image pixels. In some embodiments, the sensors 102 are capable of other forms of imaging such as RGB, intensity, or thermal information. As an example, thermal imaging can be incorporated into the sensor to overlay a heatmap on the captured image. Areas or volumes in the range of human temperatures may be identified in order to improve the identification of humans. In the case of RGB, the RGB visible light signal can be used to verify objects with low ToF IR return, such as glass or other IR-transparent objects, since these can be imaged using RGB.

It is also possible to use transponders or emitters (either passive or active) placed directly on the objects and carried by the humans to be identified. These may be, for example, RFID or ultra-wideband (UWB) locators (in the RF spectrum) or fiducials, QR codes, or bar codes (in the visible spectrum). Herein, these active or passive devices are generically referred to as "tags." The tag signals can be used to overlay and align with the ToF signals to once again enhance the identification of humans and objects. As an example, tags can be associated only with the humans (or alternatively only with the non-human objects) to clearly discriminate between humans (to be safeguarded) and other objects that do not require safety controls. Further, tags can send information that identify particular classes of objects (e.g., humans, workpieces, other fixtures) for initial or added classification. For example, an automatic guided vehicle (AGV) can have one or more tags on its body that identify it as an AGV, while a human can have a human-identifying tag indicating the need for protection from the AGV. In addition to reporting its identity, an AGV tag can supply state information (e.g., position and velocity of the AGV as monitored in its own coordinate reference frame) to assist with, for example, safety monitoring as persons and machines such as AGVs move among workcells—see U.S. Pat. No. 11,097,422, the entire disclosure of which is hereby incorporated by reference.

Other sources of information about objects and humans in a workcell include existing systems for tracking parts for process control. These sources include proximity sensors, IR break-beam sensors, 2D or 3D vision systems that (for example) image or identify the location of a box or workpiece on a conveyor for picking or for blanking a light curtain, or whether a workpiece is in a fixture. Similarly, objects may be fitted with ultra-wideband transponders, RFID tags, barcodes, QR codes, or similar feature to permit object and position tracking using a reader, which may be localized (e.g., handheld) or covering an environment such as the workcell or factory (e.g., a real-time location services system). Signals from these sources can be used for object tracking and identification, e.g., invoking a class method in the object's computational representation that specifies when to track or identify the object. For example, an existing system may track object locations for picking. This object location information can be used as input to a method of the object's computational representation that causes it to be tracked for safety purposes and/or as a "handoff" at an entry point or a safeguarded zone.

Similarly, the 3D ToF system can pass information about the objects it identifies and tracks to the controllers managing the additional sensor systems. Hence the 3D ToF system can pass information about what is a human and what is not to the RFID or UWB controller that is "looking" for human signatures so that the controller can confirm that what it has identified is, in fact, a human. Geometric data can also be passed back to, for example, proximity sensing controllers that confirm or indicate motion or the changing shape of the tracked objects. For example, the 3D ToF system can be used to identify a pallet and pass information to the warehouse management system as to the location and state of the pallet. Alternatively, the 3D ToF system may create or identify a computational object for the pallet and store, as a data attribute of the object, the location and state of the pallet; this information can then be accessed by other IT infrastructure such as the warehouse management system.

Another approach to object detection, identification, and tracking is to incorporate known or sensed geometric data about the object. For example, certain objects may have characteristic aspect ratios or shapes that positively identify them (e.g., AGVs, conveyors), and further distinguish them from humans—who have specific signatures and shapes that are known to change in particular ways. Fixed objects, if moving in space, will retain their geometric characteristics and fixed volumes, while humans will not as they move their arms and bodies in ways that are unique to humans (and not to pieces of machinery). So it is possible for OMS 110 to classify humans from other objects from their motion and behavior and how they change or do not change their shape in the workcell.

One suitable approach to such classification is to cluster individual occupied voxels into objects that can be analyzed at a higher level. To achieve this, OMS 110 may implement any of several conventional, well-known clustering techniques such as Euclidean clustering, K-means clustering or Gibbs-sampling clustering. Any of these or similar algorithms can be used to identify clusters of occupied voxels from 3D point cloud data. Mesh techniques, which determine a mesh that best fits the point-cloud data and then use the mesh shape to determine optimal clustering, may also be used. Once identified, these clusters can be useful in various ways.

Clusters can be tracked over time by simply associating identified clusters in each image frame with nearby clusters in previous frames or using more sophisticated image-processing techniques. Such techniques may include, for example, using proximity sensors or other control modalities to "guess" the presence of entities that may corresponding to clusters followed by confirmation using the optical sensors 102. Alternatively, images recorded by the sensors 102 may be analyzed and searched for objects, possibly in approximate locations, which may be identified and tracked and thereby associated with clusters. The shape, size, or other features of a cluster can be identified and tracked from one frame to the next. Such features can be used to confirm associations between clusters from frame to frame, or to identify the motion of a cluster. This information can be used to enhance or enable some of the classification techniques described below.

It may be necessary to further classify objects into one or more of four categories: (1) elements of the controlled machinery, (2) the workpiece or workpieces on which the machinery operating, and (3) other objects, including people, that may be moving in unpredictable ways. It may or may not be necessary to conclusively classify people versus other unknown foreign objects. But if it is necessary to positively identify people as differentiated from other objects, a number of human pose-estimation techniques are readily available and can be utilized by OMS 110. See, e.g., A. Sengupta, I. Budvytis and R. Cipolla, "Probabilistic 3D human shape and pose estimation from multiple unconstrained images in the wild," *Proc. IEEE Conf. on Computer Vision and Pattern Recognition, Virtual*, June 2021, which is incorporated herein by reference, and the citation therein.

In cases where the machinery changes shape, elements of the machinery can be identified and classified based on computational information characterizing these elements (e.g., scalable 3D representations), and in some cases (such as industrial robot arms) providing a source of instantaneous information about the state of the machinery. OMS 110 may be "trained" to recognize machinery through its various poses and shape changes by operating the machinery, conveyors, etc. in isolation under observation by sensors or through the reading of other signals (for example, tags such as RFID or fiducials) to learn their precise regions of operation resulting from execution of the full repertoire of motions and poses.

Conventional computer-vision techniques may be employed by OMS 110 to distinguish between workpieces and humans. These include deep learning, a branch of machine learning designed to use higher levels of abstraction in data. Among the most successful of these deep-learning algorithms have been convolutional neural networks (CNNs) and recurrent neural networks (RNNs). Such techniques may be employed by OMS 110 for recognition purposes so long as they are suitably biased against misidentifications that could cause harm to a human or otherwise represent a safety hazard. For example, machine-learning algorithms (including CNNs and RNNs) can generally be tuned to prefer false positives or false negatives. False positives in this scenario do not create a safety hazard—if the robot mistakes a workpiece for a human, it will react conservatively—while false negatives can subject humans to danger.

Additionally, multiple algorithms or neural networks based on different image properties can be used, promoting the diversity that may be key to achieving sufficient reliability for safety ratings. One particularly valuable source of diversity can be obtained by using sensors that provide both 3D and 2D image data of the same object. If any one technique identifies an object as human, the object will be treated as human. Using multiple techniques or machine-learning algorithms, all tuned to favor false positives over false negatives, sufficient reliability can be achieved. In addition, multiple images can be tracked over time, further enhancing reliability and again every object can be treated as human until enough identifications have characterized it as non-human to achieve reliability metrics. Essentially, this diverse algorithmic approach, rather than identifying humans, identifies things that are definitely not humans.

In addition to combining classification techniques, it is possible to identify workpieces in ways that do not rely on any type of human classification at all. One approach is to configure OMS 110 system by providing models of workpieces. For example, a "teaching" step in system configuration may simply supply images or key features of a workpiece or workcell feature searches for matching configurations or may instead involve training of a neural network to automatically classify workpieces as such in the space map. In either case, only objects that accurately match the stored model are treated as workpieces or objects in the workcell or safeguarded space, while all other objects are treated as humans. All of these techniques can be used separately or in combination, depending on design requirements and environmental constraints. Knowing reliably about physical objects, together with additional classifications (for example, as above with tags) it is possible to attach attributes to the objects and provide a safety classification. For example, identifying a sufficiently large fixed object in the workcell between a robot and a human means that it is safe for the human to be behind the object away from the robot and safely come close to the object at a distance smaller than would be possible if the object were not there, as the object is large enough to block the human from the hazardous machinery. This object may be something as simple as a fence or a gate. In other words, from a safety perspective, the object is acting as a protective "fence" that prevents the human from approaching the robot while it is in motion.

Geometric data capture can also be used to image the spaces not covered or occupied by objects. By knowing their geometric characteristics, it is possible to determine if a human can occupy the space. If the volume is too small, or in a location such that it would be impossible for it to be occupied by a human (for example, between a fence and a piece of machinery blocking access to the empty space), it can be classified as safe since a human or a human appendage cannot occupy the space. And if the volume and its location are such that it could hold a human, it may be classified as potentially unsafe. Classification may depend not only on absolute volume but also on impossible or unlikely configurations that can help improve the granularity of classification. For example, humans do not float in free space, likely will not hang from machinery or ceiling fixtures, etc.

Alternatively, or in addition, objects identified in a workcell may be classified as inherently safe or unsafe. For example, a toolbox in the workcell can be always marked safe even if it moves within the workcell, as it is inherently safe. This may be accomplished using data attributes of an object's computational representation, which can indicate whether the object is capable of movement and whether it inherently poses danger to humans. In the latter case, danger can be assessed by a method attribute; for example, a danger-level method associated with a movable vehicle may base an instantaneous danger level on the weight and speed of the vehicle, with a stationary vehicle posing no danger. Similarly, it may be safe to touch an empty vessel but not one filled with hot water, as detected by a temperature sensor and reflected in the danger-level output of the vessel object's method attribute. In this way, an object's attributes are carried in time and space and updated as the object operates and/or moves in the workcell. The decision whether a volume or zone is safe or unsafe can then depend on what objects occupy it and their current state.

This approach can also be used to annotate the presence of humans and to track them while in the workcell, calculating, for example, the number of humans in a workcell. This information can be exported to other systems monitoring the workcell. For example, if a workcell is supposed to have two humans in it, only when OMS 110 positively identifies two humans will ancillary systems (e.g., power to the workcell) be activated. This information can also be used for monitoring and efficiency purposes by workcell-level or factory-level management systems.

The separation of tracking and safeguarding also allows for the tracking of objects and humans outside the safeguarded space, which we define as the volume that is being actively monitored for objects and humans. In general, the safeguarded space corresponds to the space occupied by the workcell. This eliminates the need for tracking entry points for objects smaller than a human, as the tracking may be performed outside the safeguarded volume, knowing where the humans are outside the safeguarded volume. Once a human enters the safeguarded volume, it is known to be a human as it has been tracked as such by the workcell's vision system or one associated with an adjacent workcell and in communication with the workcell's vision system (see, e.g., U.S. Pat. No. 11,097,422, the entire disclosure of which is hereby incorporated by reference).

7. Determining Robot State

A robot state determination module (RSDM) 420 is responsive to data from sensors 102 and signals from the robot 402 and/or robot controller 407 to determine the instantaneous state of the robot. In particular, RSDM 420 determines the pose and location of robot 402 within workspace 400; this may be achieved using sensors 102, signals from the robot and/or its controller, or data from some combination of these sources. RSDM 420 may also determines the instantaneous velocity of robot 402 or any appendage or end effector thereof; in addition, knowledge of the robot's instantaneous joint accelerations or torques, or planned future trajectory, may be needed in order to determine motion constraints for the subsequent cycle as described below. Typically, this information comes from robot controller 407, but in some cases may be inferred directly from images recorded by sensors 102. For example, these data may be provided by the robot 402 or the robot controller 407 via a safety-rated communication protocol providing access to safety-rated data. The 3D pose of the robot may then be determined by combining provided joint positions with a static 3D model of each link and any end effectors to obtain the 3D shape of the entire robot 402.

In some cases, the robot may provide an interface to obtain joint positions that are not safety-rated, in which case the joint positions can be verified against images from sensors 102 (using, for example, safety-rated software). For example, received joint positions may be combined with static 3D models of each link and any end effectors to generate a 3D model of the entire robot 402. This 3D image can be used to remove any objects in the sensing data that are part of the robot itself. If the joint positions are correct, this will fully eliminate all object data attributed to the robot 402. If, however, the joint positions are incorrect, the true position of robot 402 will diverge from the model, and some parts of the detected robot will not be removed. Those points will then appear as a foreign object in the new cycle. In the previous cycle, it can be assumed that the joint positions were correct because otherwise robot 402 would have been halted. Since the base joint of the robot does not move, at least one of the divergent points must be close to the robot. The detection of an unexpected entity close to robot 402 can then be used to trigger an error condition, which will cause control system 112 (see FIG. 1) to transition robot 402 to a safe state. Alternatively, sensor data can be used to identify the position of the robot using a correlation algorithm, such as described above in the section on registration, and this detected position can be compared with the joint position reported by the robot. If the joint position information provided by robot 402 has been validated in this manner, it can be used to validate joint velocity information, which can then be used to predict future joint positions. If these positions are inconsistent with previously validated actual joint positions, the program can similarly trigger an error condition. These techniques enable use of a non-safety-rated interface to produce data that can then be used to perform additional safety functions.

Finally, RSDM 420 may be configured to determine the robot's joint state using only image information provided by sensors 102, without any information provided by robot 402 or controller 407 sensors 102. Given a model of all of the links in the robot, any of several conventional, well-known computer vision techniques can be used by RSDM 420 to register the model to sensor data, thus determining the location of the modeled entity in the image. For example, the ICP algorithm minimizes the difference between two 3D point clouds. ICP often provides a locally optimal solution efficiently, and thus can be used accurately if the approximate location is already known. This will be the case if the algorithm is run every cycle, since robot 402 cannot have moved far from its previous position. Accordingly, globally optimal registration techniques, which may not be efficient enough to run in real time, are not required. Digital filters such as Kalman filters or particle filters can then be used to determine instantaneous joint velocities given the joint positions identified by the registration algorithm.

These image-based monitoring techniques often rely on being run at each system cycle, and on the assumption that the system was in a safe state at the previous cycle. Therefore, a test may be executed when robot 402 is started—for example, confirming that the robot is in a known, pre-configured "home" position and that all joint velocities are zero. It is common for automated equipment to have a set of tests that are executed by an operator at a fixed interval, for example, when the equipment is started up or on shift changes. Reliable state analysis typically requires an accurate model of each robot link. This model can be obtained a priori, e.g., from 3D CAD files provided by the robot manufacturer or generated by industrial engineers for a specific project. However, such models may not be available, at least not for the robot and all of the possible attachments it may have.

In this case, it is possible for RSDM 420 to create the model itself, e.g., using sensors 102. This may be done in a separate training mode where robot 402 runs through a set of motions, e.g., the motions that are intended for use in the given application and/or a set of motions designed to provide sensors 102 with appropriate views of each link and end effector. It is possible, but not necessary, to provide some basic information about the robot a priori, such as the lengths and rotational axes of each link. During this training mode, RSDM 420 generates a 3D model of each link, complete with all necessary attachments. This model can then be used by RSDM 420 in conjunction with sensor images to determine the robot state.

8. Determining Safe-Action Constraints

In traditional axis- and rate-limitation applications, an industrial engineer calculates what actions are safe for a robot, given the planned trajectory of the robot and the layout of the workspace—forbidding some areas of the robot's range of motion altogether and limiting speed in other areas. These limits assume a fixed, static workplace environment. Here we are concerned with dynamic environments in which objects and people come, go, and change position; hence, safe actions are calculated by a safe-action determination module (SADM) 425 in real time based on all sensed relevant entities, safety data specified in objects representing the entities, and on the current state of robot 402; these safe actions may be updated each cycle. In order to be considered safe, actions should comply with restrictions contained in all objects corresponding to (human or non-human) entities in proximity to the robot—ensuring, at a minimum, that robot 402 does not collide with any stationary object, and also that robot 402 does not come into contact with a person who may be moving toward the robot. Since robot 402 has some maximum possible deceleration, controller 407 should be instructed to begin slowing the robot down sufficiently in advance to ensure that it can reach a complete stop before contact is made, taking into account the dimensions of the robot's end effector(s).

Figure 5:
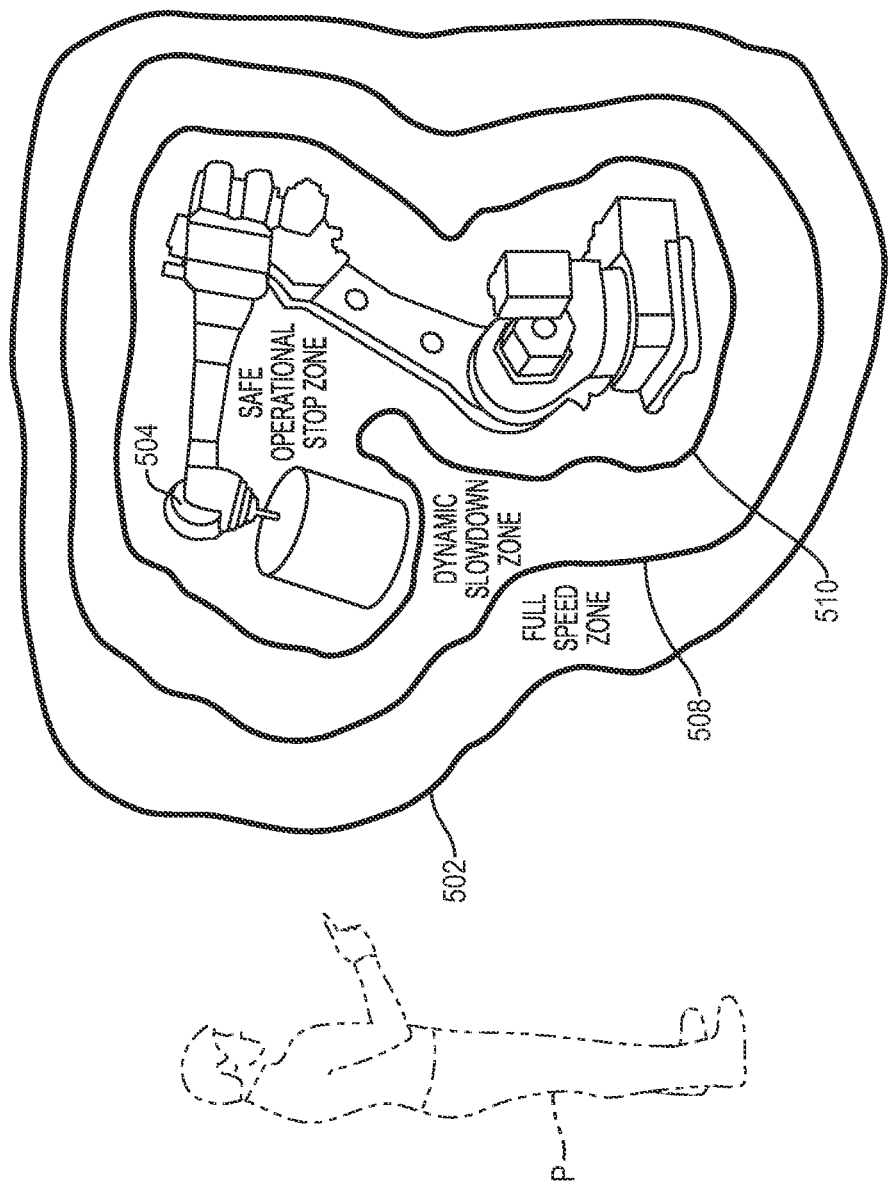
FIG. 5 schematically illustrates the definition of progressive safety envelopes in proximity to a piece of industrial machinery.

One approach to achieving this is to modulate the robot's maximum velocity (by which is meant the velocity of the robot itself or any appendage thereof) proportionally to the minimum distance between any point on the robot and any point in the relevant set of sensed entities to be avoided. The robot is allowed to operate at maximum speed when the closest entity is further away than some threshold distance beyond which violations of the protective separation distance specified in the relevant object are not a concern, and the robot may be halted altogether if a vulnerable entity is within a certain minimum distance. Sufficient margin can be added to the specified distances to account for movement of relevant entities toward the robot at some maximum realistic velocity. This is illustrated in FIG. 5. An outer envelope or 3D zone 502 is generated computationally by SADM 425 around the robot 504 based on the protective separation distance specified in the object representing the person P, including all appendages and end effectors. Outside this zone 502, all movements of the person P are considered safe because, within an operational cycle, they cannot bring the person sufficiently close to the robot 504 to pose a danger. Detection of any portion of the person P's body within a second 3D zone 508, computationally defined within zone 502, is registered by SADM 425 but robot 504 is allowed to continue operating at full speed. If any portion of the person P crosses the threshold of zone 508 but is still outside an interior danger zone 510, robot 504 is signaled to operate at a slower speed. If any portion of the person P crosses into the danger zone 510—or is predicted to do so within the next cycle based on a model of human movement—operation of robot 504 is halted. These zones may be updated if robot 504 is moved (or moves) within the environment.

A refinement of this technique is for SADM 425 to control maximum velocity proportionally to the square root of the minimum distance, which reflects the fact that in a constant-deceleration scenario, velocity changes proportionally to the square root of the distance traveled, resulting in a smoother and more efficient, but still equally safe, result. A further refinement is for SADM 425 to modulate maximum velocity proportionally to the minimum possible time to collision— that is, to project the robot's current state forward in time, project the intrusions toward the robot trajectory, and identify the nearest potential collision or violation of an object-specified protective separation distance. This refinement has the advantage that the robot will move more quickly away from an obstacle than toward it, which maximizes throughput while still correctly preserving safety. Since the robot's future trajectory depends not just on its current velocity but on subsequent commands, SADM 425 may consider all points reachable by robot 402 within a certain reaction time given its current joint positions and velocities, and cause control signals to be issued based on the minimum collision time among any of these states. Yet a further refinement is for SADM 425 to take into account the entire planned trajectory of the robot when making this calculation, rather than simply the instantaneous joint velocities. Additionally, SADM 425 may, via robot controller 407, alter the robot's trajectory, rather than simply alter the maximum speed along that trajectory. It is possible to choose from among a fixed set of trajectories one that reduces or eliminates potential collisions or protective separation distance violations, or even to generate a new trajectory on the fly.

While not necessarily a safety violation, collisions with static elements of the workspace are generally not desirable. The set of relevant entities can include all entities in the workspace, including both static background such as walls and tables, and moving entities such as workpieces and human workers. Either from prior configuration or run-time detection, sensors 102 and analysis module 342 may be able to infer which entities could possibly be moving. In this case, any of the algorithms described above can be refined to leave additional margins to account for entities that might be moving, but to eliminate those margins for entities that are known to be static, so as not to reduce throughput unnecessarily but still automatically eliminate the possibility of collisions with static parts of the work cell.

Beyond simply leaving margins to account for the maximum velocity of potentially moving entities, state estimation techniques based on information detected by the sensing system can be used to project the movements of humans and other entities forward in time, thus expanding the control options available to control routines 350. For example, skeletal tracking techniques can be used to identify moving limbs of humans that have been detected and limit potential collisions or protective separation distance violations based on properties of the human body and estimated movements of, e.g., a person's arm rather than the entire person.

9. Communicating Safe Action Constraints to the Robot

The safe-action constraints identified by SADM 425 may be communicated by OMS 410 to robot controller 407 on each cycle via a robot communication module 430. As described above, communication modules may correspond to an I/O port 327 interface to a complementary port on robot controller 407 or may correspond to transceiver 325. Most industrial robots provide a variety of interfaces for use with external devices. A suitable interface should operate with low latency at least at the control frequency of the system. The interface can be configured to allow the robot to be programmed and run as usual, with a maximum velocity being sent over the interface. Alternatively, some interfaces allow for trajectories to be delivered in the form of waypoints. Using this type of an interface, the intended trajectory of robot 402 can be received and stored within OMS 410, which may then generate waypoints that are closer together or further apart depending on the safe-action constraints. Similarly, an interface that allows input of target joint torques can be used to drive trajectories computed in accordance herewith. These types of interfaces can also be used where SADM 425 chooses new trajectories or modifies trajectories depending on the safe-action constraints.

As with the interface used to determine robot state, if robot 402 supports a safety-rated protocol that provides real-time access to the relevant safety-rated control inputs, this may be sufficient. However, if a safety-rated protocol is not available, additional safety-rated software on the system can be used to ensure that the entire system remains safe. For example, SADM 425 may determine the expected speed and position of the robot if the robot is operating in accordance with the safe actions that have been communicated. SADM 425 then determines the robot's actual state as described above. If the robot's actions do not correspond to the expected actions, SADM 425 causes the robot to transition to a safe state, typically using an emergency stop signal. This effectively implements a real-time safety-rated control scheme without requiring a real-time safety-rated interface beyond a safety-rated stopping mechanism.

In some cases, a hybrid system may be optimal—many robots have a digital input that can be used to hold a safety-monitored stop. It may be desirable to use a communication protocol for variable speed, for example, when intruding entities are relatively far from the robot, but to use a digital safety-monitored stop when the robot must come to a complete stop, for example, when intruding entities are close to the robot.

Certain embodiments of the present invention are described above. It is, however, expressly noted that the present invention is not limited to those embodiments; rather, additions and modifications to what is expressly described herein are also included within the scope of the invention.

What is claimed is:

1. A safety system for monitoring a three-dimensional (3D) workspace including machinery performing an activity, the system comprising:
   a plurality of sensors distributed about the workspace, each of the sensors comprising a grid of pixels for recording images of a portion of the workspace within a sensor field of view, the workspace portions collectively covering the entire workspace;
   a computer memory for storing (i) a plurality of images from the sensors, (ii) a model of the machinery and its movement capabilities; and
   a processor configured to:
      computationally generate, from the stored images, a 3D spatial representation of the workspace;
      identify a plurality of non-machinery entities within the workspace and, for each identified entity, generate and store an object specifying a plurality of attributes of the identified entity including its spatial extent and a protective separation distance associated therewith;
      recognize interaction between first and second identified entities in the workspace and, in response, merge the objects associated with the interacting entities into a merged object; and
      control operation of the machinery in accordance with a safety protocol and the protective separation distance of the merged object.

2. The safety system of claim 1, wherein the processor is further configured to:
   recognize dissociation between the first and second identified entities;
   generate and store separate objects corresponding to the first and second identified entities and specifying at least some different attributes.

3. The safety system of claim 1, wherein each of the objects specifies at least one associated computer-executable method.

4. The safety system of claim 1, wherein at least one of the identified entities is a non-human entity.

5. The safety system of claim 1, wherein the objects corresponding to the first and second identified entities specify different protective separation distances, the merged object specifying the larger protective separation distance.

6. The safety system of claim 3, wherein the at least one associated computer-executable method includes a method for causing generation of a hierarchically superior object including the specifying object.

7. The safety system of claim 1, wherein interaction between the first and second identified entities corresponds to contact between the entities.

8. The safety system of claim 1, wherein interaction between the first and second identified entities corresponds to proximity of the entities.

9. The safety system of claim 1, wherein the processor is further configured to generate and store an object specifying a zone within the workspace to be treated, for purposes of controlling the machinery, as empty.

10. The safety system of claim 1, wherein the processor is further configured to:
generate a display of at least a portion of the workspace;
receive commands indicating entities in the workspace to be merged; and
merge objects associated with the indicated entities into a single object.

11. The safety system of claim 10, wherein the processor is further configured to receive commands to change at least one attribute associated with the single object.

12. The safety system of claim 1, wherein the processor is further configured to:
generate a display of at least a portion of the workspace;
receive commands indicating entities in the workspace associated with a merged object;
generate and store separate objects corresponding to indicated entities and delete the merged object.

13. The safety system of claim 1, wherein the processor is responsive to an external tracking system and is further configured to identify at least one of the non-machinery entities based on data from the external tracking system.

14. The safety system of claim 13, wherein the external tracking system includes at least one of proximity sensors, IR break-beam sensors, or 2D or 3D vision systems.

15. The safety system of claim 13, wherein at least some of the non-machinery entities include a feature to permit object and position tracking by the external tracking system.

16. The safety system of claim 15, wherein the feature is at least one of an ultra-wideband transponder, an RFID tag, a barcode, or a QR code.

17. The safety system of claim 13, wherein the processor is further configured to make data available to a controller of the at least one said non-machinery entity based on the identification.

18. A method of controlling machinery performing an activity in a three-dimensional (3D) workspace, the method comprising the steps of:
providing a plurality of sensors distributed about the workspace, each of the sensors comprising a grid of pixels for recording images of a portion of the workspace within a sensor field of view, the workspace portions collectively covering the entire workspace;
storing (i) a plurality of images from the sensors, (ii) a computational model of the machinery and its movement capabilities;
computationally generating, from the stored images, a 3D spatial representation of the workspace;
computationally identifying a plurality of non-machinery entities within the workspace and, for each identified entity, computationally generating and storing an object data structure specifying a plurality of attributes of the identified entity including its spatial extent and a protective separation distance associated therewith;
recognizing interaction between first and second identified entities in the workspace and, in response, merging the object data structures associated with the interacting entities into a merged object data structure; and
computationally controlling operation of the machinery in accordance with a safety protocol and the protective separation distance of the merged object data structure.

19. The method claim 18, further comprising the steps of:
recognizing dissociation between the first and second identified entities;
generating and storing separate object data structures corresponding to the first and second identified entities and specifying at least some different attributes.

20. The method of claim 18, wherein each of the object data structures specifies at least one associated computer-executable method.

21. The method of claim 18, wherein at least one of the identified entities is a non-human entity.

22. The method of claim 18, wherein the object data structures corresponding to the first and second identified entities specify different protective separation distances, the merged object data structure specifying the larger protective separation distance.

23. The method of claim 20, wherein the at least one associated computer-executable method includes a method for causing generation of a hierarchically superior object data structure including the specifying object data structure.

24. The method of claim 18, wherein interaction between the first and second identified entities corresponds to contact between the entities.

25. The method of claim 18, wherein interaction between the first and second identified entities corresponds to proximity of the entities.

26. The method of claim 18, further comprising generating and storing an object data structure specifying a zone within the workspace to be treated, for purposes of controlling the machinery, as empty.

27. The method of claim 18, further comprising the steps of:
generating a display of at least a portion of the workspace;
receiving commands indicating entities in the workspace to be merged; and
merging object data structures associated with the indicated entities into a single object data structure.

28. The method of claim 27, wherein the processor is further configured to receive commands to change at least one attribute associated with the single object data structure.

29. The method of claim 18, further comprising the steps of:
generating a display of at least a portion of the workspace;
receiving commands indicating entities in the workspace associated with a merged object data structure; and
generating and storing separate object data structures corresponding to indicated entities and deleting the merged object data structure.

30. The method of claim 18, wherein the step of computationally identifying a plurality of non-machinery entities within the workspace is performed based on data received from an external tracking system.

31. The method of claim 30, wherein the external tracking system includes at least one of proximity sensors, IR break-beam sensors, or 2D or 3D vision systems.

32. The method of claim 30, wherein at least some of the non-machinery entities include a feature to permit object and position tracking by the external tracking system.

33. The method of claim 32, wherein the feature is at least one of an ultra-wideband transponder, an RFID tag, a barcode, or a QR code.

34. The method of claim 30, further comprising the step of communicating the data to a controller of at least one said non-machinery entity based on the identification.

35. A safety system for monitoring a three-dimensional (3D) workspace including machinery performing an activity, the system comprising:
a plurality of sensors distributed about the workspace, each of the sensors comprising a grid of pixels for recording images of a portion of the workspace within a sensor field of view, the workspace portions collectively covering the entire workspace;
a computer memory for storing (i) a plurality of images from the sensors, (ii) a model of the machinery and its movement capabilities; and
a processor configured to:
computationally generate, from the stored images, a 3D spatial representation of the workspace;
identify a plurality of machinery and non-machinery entities within the workspace and, for each identified entity, generate and store an object specifying a plurality of attributes of the identified entity including its spatial extent and a protective separation distance associated therewith;
monitor a distance between first and second identified entities in the workspace; and
control operation of the machinery in accordance with the monitored distance and the attributes specified by the objects corresponding to the identified entities.

36. The safety system of claim 35, wherein each of the objects specifies at least one associated computer-executable method.

37. The safety system of claim 35, wherein at least one of the identified entities is a non-human entity.

38. The safety system of claim 35, wherein the objects corresponding to the first and second identified entities specify different protective separation distances.

39. The safety system of claim 36, wherein the at least one associated computer-executable method includes a method for causing generation of a hierarchically superior object including the specifying object.

40. The safety system of claim 35, wherein the monitored distance signifies interaction between the first and second identified entities based on contact between the entities.

41. The safety system of claim 35, wherein the monitored distance signifies interaction between the first and second identified entities based on proximity of the entities.

42. The safety system of claim 35, wherein the processor is further configured to generate and store an object specifying a zone within the workspace to be treated, for purposes of controlling the machinery, as empty.

43. The safety system of claim 35, wherein operation of the machinery requires presence of at least one of the identified entities in a specified location.

44. A method of controlling machinery performing an activity in a three-dimensional (3D) workspace, the method comprising the steps of:
providing a plurality of sensors distributed about the workspace, each of the sensors comprising a grid of pixels for recording images of a portion of the workspace within a sensor field of view, the workspace portions collectively covering the entire workspace;
storing (i) a plurality of images from the sensors, (ii) a computational model of the machinery and its movement capabilities;
computationally generating, from the stored images, a 3D spatial representation of the workspace;
computationally identifying a plurality of non-machinery entities within the workspace and, for each identified entity, computationally generating and storing an object data structure specifying a plurality of attributes of the identified entity including its spatial extent and a protective separation distance associated therewith;
monitor a distance between first and second identified entities in the workspace; and
computationally controlling operation of the machinery in accordance with the monitored distance and the attributes specified by the object data structures corresponding to the identified entities.

45. The method of claim 44, wherein each of the object data structures specifies at least one associated computer-executable method.

46. The method of claim 44, wherein at least one of the identified entities is a non-human entity.

47. The method of claim 44, wherein the object data structures corresponding to the first and second identified entities specify different protective separation distances.

48. The method of claim 45, wherein the at least one associated computer-executable method includes a method for causing generation of a hierarchically superior object including the specifying object data structure.

49. The method of claim 44, wherein the monitored distance signifies interaction between the first and second identified entities based on contact between the entities.

50. The method of claim 44, wherein the monitored distance signifies interaction between the first and second identified entities based on proximity of the entities.

51. The method of claim 44, further comprising the step of computationally generating and storing an object data structure specifying a zone within the workspace to be treated, for purposes of controlling the machinery, as empty.

52. The method of claim 44, wherein operation of the machinery requires presence of at least one of the identified entities in a specified location.

* * * * *